(12) United States Patent
Kim et al.

(10) Patent No.: US 10,365,517 B2
(45) Date of Patent: Jul. 30, 2019

(54) LIQUID CRYSTAL DISPLAY DEVICE

(71) Applicant: Samsung Display Co., Ltd., Yongin-Si, Gyeonggi-Do (KR)

(72) Inventors: Jong-Keun Kim, Seoul (KR); Jeong Man Son, Suwon-si (KR); Jin Young Lee, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 382 days.

(21) Appl. No.: 14/993,759

(22) Filed: Jan. 12, 2016

(65) Prior Publication Data
US 2016/0209716 A1    Jul. 21, 2016

(30) Foreign Application Priority Data
Jan. 19, 2015    (KR) .......................... 10-2015-0008681

(51) Int. Cl.
*G02F 1/1343*    (2006.01)
*G02F 1/1337*    (2006.01)

(52) U.S. Cl.
CPC .. *G02F 1/134309* (2013.01); *G02F 1/133707* (2013.01); *G02F 2001/134345* (2013.01)

(58) Field of Classification Search
CPC ............ G02F 1/133707; G02F 1/1343; G02F 2001/134345; G02F 1/134363; G02F 1/134309

USPC .......................................................... 349/129
See application file for complete search history.

(56) References Cited

U.S. PATENT DOCUMENTS

| | | | |
|---|---|---|---|
| 2010/0039418 A1* | 2/2010 | Chen .................... | G09G 3/3611 345/208 |
| 2011/0063557 A1* | 3/2011 | Kim .................. | G02F 1/134309 349/141 |

FOREIGN PATENT DOCUMENTS

| | | |
|---|---|---|
| KR | 10-2013-0025066 | 3/2013 |
| KR | 10-2013-0122824 | 11/2013 |
| KR | 10-2014-0000589 | 1/2014 |

* cited by examiner

*Primary Examiner* — Thanh Nhan P Nguyen
(74) *Attorney, Agent, or Firm* — Innovation Counsel LLP

(57) ABSTRACT

A display device may include the following elements: a first color filter, which has a first color; a first pixel electrode, which overlaps the first color filter and includes a first stem electrode and a first branch electrode, wherein the first branch electrode is oriented at an acute angle with respect to the first stem electrode; a second color filter, which has a second color different from the first color; and a second pixel electrode, which overlaps the second color filter, immediately neighbors the first pixel electrode, and includes a second stem electrode and a second branch electrode, wherein the second stem electrode is aligned with the first stem electrode, and wherein a shape of a combination of the second stem electrode and the second branch electrode is a mirror image of a shape of a combination of the first stem electrode and the first branch electrode.

18 Claims, 16 Drawing Sheets

LIQUID CRYSTAL DISPLAY DEVICE

CROSS-REFERENCE TO RELATED APPLICATION

This application claims priority to and the benefit of Korean Patent Application No. 10-2015-0008681 filed in the Korean Intellectual Property Office on Jan. 19, 2015; the entire contents of the Korean Patent Application are incorporated herein by reference.

BACKGROUND (a) Technical Field

The technical field is related to a liquid crystal display device.

(b) Description of Related Art

A liquid crystal display device may include two panels with field generating electrodes, such as a pixel electrode and a common electrode, and may include a liquid crystal layer interposed between the field generating electrodes. The field generating electrodes may apply an electric field on the liquid crystal layer to control directions of liquid crystal molecules in the liquid crystal layer for controlling transmission of light, such that an image may be displayed. When viewed at different viewing angles, the image displayed by the liquid crystal display device may undesirably provide different luminances for different colors.

The above information disclosed in this Background section is for enhancement of understanding of the background of the invention. The Background section may contain information that does not form the prior art that is already known in this country to a person of ordinary skill in the art.

SUMMARY

An embodiment may be related to a display device. The display device may include a first color filter, a first pixel electrode, a second color filter, a second pixel electrode, a third color filter, and a third pixel electrode. The first color filter may have a first color. The first pixel electrode may overlap the first color filter and may include a first stem electrode and a first branch electrode. The first branch electrode may be oriented (and/or may extend) at a first acute angle with respect to the first stem electrode. The second color filter may have a second color. The second color may be different from the first color. The second pixel electrode may overlap the second color filter, may immediately neighbor the first pixel electrode (without any intervening pixel electrode between the first pixel electrode and the second pixel electrode), and may include a second stem electrode and a second branch electrode. The second stem electrode may be aligned with the first stem electrode in the first direction. A shape of a combination of the second stem electrode and the second branch electrode may be a mirror image of a shape of a combination of the first stem electrode and the first branch electrode. The third color filter may have the first color or a third color. The third color may be different from each of the first color and the second color. The third pixel electrode may overlap the third color filter, may immediately neighbor the first pixel electrode (with no intervening pixel electrode between the first pixel electrode and the third pixel electrode), and may include a third stem electrode and a third branch electrode. A shape of a combination of the third stem electrode and the third branch electrode may be identical to the shape of the combination of the first stem electrode and the first branch electrode. These features can be appreciated from, for example, one or more of FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, and FIG. 17; and related description.

The third stem electrode may be aligned with the first stem electrode in the first direction. The third color filter may have the third color. These features can be appreciated from, for example, one or more of FIG. 8, FIG. 9, and FIG. 10; and related description.

The display device may include the following elements: a fourth color filter, which may have the first color; and a fourth pixel electrode, which may overlap the fourth color filter, may immediately neighbor the first pixel electrode in a second direction, and may include a fourth stem electrode and a fourth branch electrode. The second direction may be perpendicular to the first direction. A shape of a combination of the fourth stem electrode and the fourth branch electrode may be identical to the shape of the combination of the second stem electrode and the second branch electrode. These features can be appreciated from, for example, one or more of FIG. 8, FIG. 9, and FIG. 10; and related description.

The display device may include the following elements: a fourth color filter, which may have the second color; and a fourth pixel electrode, which may overlap the fourth color filter, may immediately neighbor the third pixel electrode, and may include a fourth stem electrode and a fourth branch electrode. The fourth stem electrode may be aligned with the third stem electrode in the first direction. A shape of a combination of the fourth stem electrode and the fourth branch electrode may be identical to the shape of the combination of the second stem electrode and the second branch electrode. These features can be appreciated from, for example, one or more of FIG. 8, FIG. 9, and FIG. 10; and related description.

The display device may include the following elements: a fourth color filter, which may have a fourth color, wherein the fourth color may be different from each of the first color, the second color, and the third color; and a fourth pixel electrode, which may overlap the fourth color filter, may immediately neighbor the third pixel electrode, and may include a fourth stem electrode and a fourth branch electrode. The fourth stem electrode may be aligned with the third stem electrode in the first direction. A shape of a combination of the fourth stem electrode and the fourth branch electrode may be identical to the shape of the combination of the third stem electrode and the third branch electrode. The second color may be a white color. These features can be appreciated from, for example, one or more of FIG. 15, FIG. 16, and FIG. 17; and related description.

The display device may include the following elements: a fifth color filter, which may have the fourth color; and a fifth pixel electrode, which may overlap the fifth color filter, may immediately neighbor the second pixel electrode, and may include a fifth stem electrode and a fifth branch electrode. The fifth stem electrode may be aligned with the second stem electrode in the first direction. A shape of a combination of the fifth stem electrode and the fifth branch electrode may be identical to the shape of the combination of the second stem electrode and the second branch electrode. These features can be appreciated from, for example, one or more of FIG. 15, FIG. 16, and FIG. 17; and related description.

The display device may include the following elements: a sixth color filter, which may have the third color; and a sixth pixel electrode, which may overlap the sixth color filter, may immediately neighbor the fifth pixel electrode, and may include a sixth stem electrode and a sixth branch electrode. The sixth stem electrode may be aligned with the fifth stem electrode in the first direction. A shape of a combination of the sixth stem electrode and the sixth branch electrode may be identical to the shape of the combination of the second stem electrode and the second branch electrode. These features can be appreciated from, for example, one or more of FIG. 15, FIG. 16, and FIG. 17; and related description.

The display device may include the following elements: a seventh color filter, which may have the first color; and a seventh pixel electrode, which may overlap the seventh color filter, may immediately neighbor the sixth pixel electrode, and may include a seventh stem electrode and a seventh branch electrode. The seventh stem electrode may be aligned with the sixth stem electrode in the first direction. A shape of a combination of the seventh stem electrode and the seventh branch electrode may be identical to the shape of the combination of the second stem electrode and the second branch electrode. These features can be appreciated from, for example, one or more of FIG. 15, FIG. 16, and FIG. 17; and related description.

The display device may include the following elements: an eighth color filter, which may have the second color; and an eighth pixel electrode, which may overlap the eighth color filter, may immediately neighbor the seventh pixel electrode, and may include an eighth stem electrode and an eighth branch electrode. The eighth stem electrode may be aligned with the seventh stem electrode in the first direction. A shape of a combination of the eighth stem electrode and the eighth branch electrode may be identical to the shape of the combination of the first stem electrode and the first branch electrode. These features can be appreciated from, for example, one or more of FIG. 15, FIG. 16, and FIG. 17; and related description.

The third stem electrode may be aligned with the first stem electrode in a second direction. The second direction may be perpendicular to the first direction. The third color filter may have the first color. These features can be appreciated from, for example, one or more of FIG. 11, FIG. 12, and FIG. 13; and related description.

The display device may include the following elements: a fourth color filter, which may have the third color; and a fourth pixel electrode, which may overlap the fourth color filter, may immediately neighbor the first pixel electrode, and may include a fourth stem electrode and a fourth branch electrode. The fourth stem electrode may be aligned with the first stem electrode in the first direction. A shape of a combination of the fourth stem electrode and the fourth branch electrode may be identical to the shape of the combination of the second stem electrode and the second branch electrode. These features can be appreciated from, for example, one or more of FIG. 11, FIG. 12, and FIG. 13; and related description.

The display device may include the following elements: a fifth color filter, which may have the second color; and a fifth pixel electrode, which may overlap the fifth color filter, may immediately neighbor the fourth pixel electrode, and may include a fifth stem electrode and a fifth branch electrode. The fifth stem electrode may be aligned with the fourth stem electrode in the first direction. A shape of a combination of the fifth stem electrode and the fifth branch electrode may be identical to the shape of the combination of the first stem electrode and the first branch electrode. These features can be appreciated from, for example, one or more of FIG. 11, FIG. 12, and FIG. 13; and related description.

The display device may include the following elements: a sixth color filter, which may have the first color; and a sixth pixel electrode, which may overlap the sixth color filter, may immediately neighbor the fifth pixel electrode, and may include a sixth stem electrode and a sixth branch electrode. The sixth stem electrode may be aligned with the fifth stem electrode in the first direction. A shape of a combination of the sixth stem electrode and the sixth branch electrode may be identical to the shape of the combination of the second stem electrode and the second branch electrode. These features can be appreciated from, for example, one or more of FIG. 11, FIG. 12, and FIG. 13; and related description.

The display device may include the following elements: a seventh color filter, which may have the third color; and a seventh pixel electrode, which may overlap the seventh color filter, may immediately neighbor the sixth pixel electrode, and may include a seventh stem electrode and a seventh branch electrode. The seventh stem electrode may be aligned with the sixth stem electrode in the first direction. A shape of a combination of the seventh stem electrode and the seventh branch electrode may be identical to the shape of the combination of the first stem electrode and the first branch electrode. These features can be appreciated from, for example, one or more of FIG. 11, FIG. 12, and FIG. 13; and related description.

The display device may include the following elements: a fourth color filter, which may have the second color; and a fourth pixel electrode, which may overlap the fourth color filter, may immediately neighbor the second pixel electrode in the second direction, and may include a fourth stem electrode and a fourth branch electrode. A shape of a combination of the fourth stem electrode and the fourth branch electrode may be identical to the shape of the combination of the second stem electrode and the second branch electrode. These features can be appreciated from, for example, one or more of FIG. 11, FIG. 12, and FIG. 13; and related description.

The display device may include the following elements: a fourth color filter, which may have the third color; and a fourth pixel electrode, which may overlap the fourth color filter, may immediately neighbor the first pixel electrode, and may include a fourth stem electrode and a fourth branch electrode. The fourth stem electrode may be aligned with the first stem electrode in the first direction. A shape of a combination of the fourth stem electrode and the fourth branch electrode may be identical to the shape of the combination of the first stem electrode and the first branch electrode. These features can be appreciated from, for example, FIG. 14 and related description.

The display device may include the following elements: a fifth color filter, which may have the third color; and a fifth pixel electrode, which may overlap the fifth color filter, may immediately neighbor the fourth pixel electrode in the second direction, and may include a fifth stem electrode and a fifth branch electrode. A shape of a combination of the fifth stem electrode and the fifth branch electrode may be identical to the shape of the combination of the first stem electrode and the first branch electrode These features can be appreciated from, for example, FIG. 14 and related description.

The display device may include the following elements: a sixth color filter, which may have the third color; and a sixth pixel electrode, which may overlap the sixth color filter, may immediately neighbor the second pixel electrode, and may include a sixth stem electrode and a sixth branch electrode. The sixth stem electrode may be aligned with the second stem electrode in the first direction. A shape of a combination of the sixth stem electrode and the sixth branch electrode may be identical to the shape of the combination of the second stem electrode and the second branch electrode These features can be appreciated from, for example, FIG. 14 and related description.

The display device may include the following elements: a seventh color filter, which may have the first color; and a seventh pixel electrode, which may overlap the seventh color filter, may immediately neighbor the sixth pixel electrode, and may include a seventh stem electrode and a seventh branch electrode. The seventh stem electrode may be aligned with the sixth stem electrode in the first direction. A shape of a combination of the seventh stem electrode and the seventh branch electrode may be identical to the shape of the combination of the first stem electrode and the first branch electrode. These features can be appreciated from, for example, FIG. 14 and related description.

An embodiment may be related to a liquid crystal display device (or liquid crystal display for conciseness) that includes a plurality of pixel areas. The liquid crystal display includes a first substrate, a second substrate, a pixel electrode located on the first substrate, a common electrode located on the second substrate, and a liquid crystal layer located between the first substrate and the second substrate. The pixel electrode includes a horizontal stem part, a vertical stem part located at an edge of the pixel area, and a fine branch part extended from the horizontal stem part and/or the vertical stem part, the pixel areas are divided (and/or grouped) into pixel groups, wherein each pixel group of the pixel groups includes at least two pixel areas adjacent in a column direction and/or a row direction, wherein an extension direction of a fine branch part of a pixel electrode is identical to an extension direction of a fine branch part of another pixel electrode in a same pixel group, and wherein an extension direction of a fine branch part in a pixel group among two adjacent pixel groups is different from an extension direction of a fine branch part in the other pixel group.

The pixel group may have an even number of pixel areas.

The pixel area may include an upper area and a lower area divided by the horizontal stem part, wherein an extension direction of the fine branch part in the upper area may be different from an extension direction of the fine branch part in the lower area.

An extension direction of the fine branch part in the upper area and an extension direction of the fine branch part in the lower area may be symmetrical with respect to the fine branch part.

In any one pixel group of adjacent pixel groups, the fine branch part in the upper area may be extended in an upper right direction from the horizontal stem part and the vertical stem part, and the fine branch part in the lower area may be extended in a lower right direction from the horizontal stem part and the vertical stem part.

In another pixel group of the adjacent pixel groups, the fine branch part in the upper area may be extended in an upper left direction from the horizontal stem part and the vertical stem part, and the fine branch part in the lower area may be extended in a lower left direction from the horizontal stem part and the vertical stem part.

The pixel area may include a first sub-pixel area and a second sub-pixel area, and each of the first sub-pixel area and the second sub-pixel area may be divided into an upper area and a lower area.

The pixel electrode may include a first sub-pixel electrode located in the first sub-pixel area, and a second sub-pixel electrode located in the second sub-pixel area, wherein each of the first sub-pixel electrode and the second sub-pixel electrode may include the horizontal stem part, the vertical stem part, and the fine branch part.

Different data voltages may be applied to the first sub-pixel electrode and the second sub-pixel electrode.

An extension direction of the fine branch part in the first sub-pixel area may be different from an extension direction of the fine branch part in the second sub-pixel area.

In any one pixel group of the adjacent pixel groups, the fine branch part in the upper area of the first sub-pixel area may be extended in an upper right direction from the horizontal stem part and the vertical stem part, the fine branch part in the lower area of the first sub-pixel area may be extended in a lower right direction from the horizontal stem part and the vertical stem part, the fine branch part in the upper area of the second sub-pixel area may be extended in an upper left direction from the horizontal stem part and the vertical stem part, and the fine branch part in the lower area of the second sub-pixel area may be extended in a lower left direction from the horizontal stem part and the vertical stem part.

In another pixel group of the adjacent pixel groups, the fine branch part in the upper area of the first sub-pixel area may be extended in an upper left direction from the horizontal stem part and the vertical stem part, the fine branch part in the lower area of the first sub-pixel area may be extended in a lower left direction from the horizontal stem part and the vertical stem part, the fine branch part in the upper area of the second sub-pixel area may be extended in an upper right direction from the horizontal stem part and the vertical stem part, and the fine branch part in the lower area of the second sub-pixel area may be extended in a lower right direction from the horizontal stem part and the vertical stem part.

A location of the vertical stem parts in the adjacent pixel groups may be different.

The vertical stem part may be located at a left edge of the pixel area in any one pixel group among the adjacent pixel groups, and the vertical stem part may be located at a right edge of the pixel area in another pixel group among the adjacent pixel groups.

The pixel area may include a first sub-pixel area and a second sub-pixel area, and each of the first sub-pixel area and the second sub-pixel area may be divided into an upper area and a lower area, wherein the pixel electrode may include a first sub-pixel electrode located in the first sub-pixel area, and a second sub-pixel electrode located in the second sub-pixel area, and wherein each of the first sub-pixel electrode and the second sub-pixel electrode may include the horizontal stem part, the vertical stem part, and the fine branch part.

A location of the vertical stem part in the first sub-pixel area may be different from a location of the vertical stem part in the second sub-pixel area.

In any one pixel group of the adjacent pixel groups, the vertical stem part in the first sub-pixel electrode may be located at a left edge of the first sub-pixel area, and the vertical stem part in the second sub-pixel electrode may be located at a right edge of the second sub-pixel area, and in another pixel group, the vertical stem part in the first sub-pixel electrode may be located at a right edge of the first sub-pixel area, and the vertical stem part in the second sub-pixel electrode may be located at a left edge of the second sub-pixel area.

The pixel area may include a first color pixel area, a second color pixel area, and a third color pixel area, the first color pixel area and the second color pixel area may be arranged to be adjacent to each other in a row direction, and the second color pixel area and the third color pixel area may be arranged to be adjacent to each other in a row direction.

The pixel group may be grouped into three pixel areas, and the three pixel areas may include the first color pixel area, the second color pixel area, and the third color pixel area.

The liquid crystal display may further include a white pixel area located between the pixel groups.

According to embodiments, different inclined directions of liquid crystal molecules may be systematically distributed among first-color pixel areas, may be systematically distributed among second-color pixel areas, may be systematically distributed among third-color pixel areas, and/or may be systematically distributed among fourth-color pixel areas. Therefore, in an image displayed by the liquid crystal display, a luminance in a right viewing angel may be substantially equal to a luminance in a left viewing angle. Advantageously, satisfactory image viewing experience may be provided.

An embodiment may prevent color deviation or luminance deviation in right and left viewing angles.

DETAILED DESCRIPTION OF EMBODIMENTS

Figure 1:
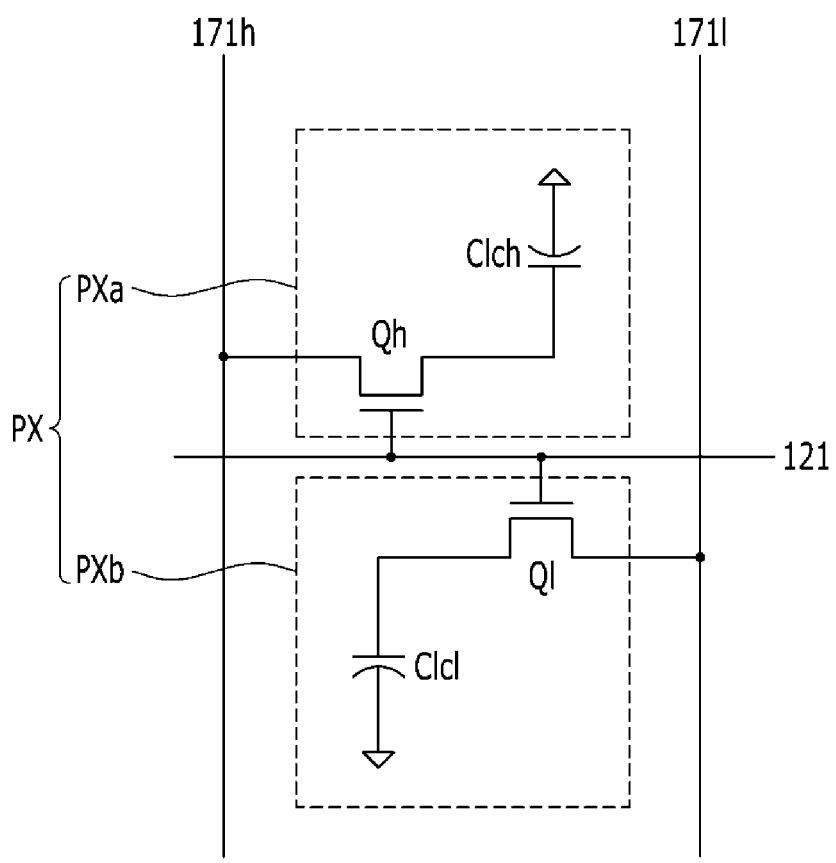
FIG. 1 is an equivalent circuit diagram illustrating a pixel of a liquid crystal display device, or liquid crystal display for conciseness, according to an embodiment.

Some embodiments are described with reference to the accompanying drawings. Embodiments may be implemented in various forms and are not limited the described embodiments.

Although the terms "first", "second", etc. may be used herein to describe various elements, these elements, should not be limited by these terms. These terms may be used to distinguish one element from another element. Thus, a first element discussed below may be termed a second element without departing from the teachings of the present invention. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the drawings, thicknesses of layers, films, panels, regions, etc., may be exaggerated for clarity. Same reference numerals may be used for identical elements or analogous elements. When a first element (such as a layer, film, region, or substrate) is referred to as being "on" a second element, the first element can be directly on the second element, or one or more intervening elements may also be present. When a first element is referred to as being "directly on" a second element, there are no intended intervening elements between the overlapping portions of the first element and the second element.

The term "connect" may mean "electrically connect". The term "insulate" may mean "electrically insulate". The term "liquid crystal display" may mean "liquid crystal display device".

FIG. 1 is an equivalent circuit diagram illustrating a pixel of a liquid crystal display according to an embodiment.

Referring to FIG. 1, the liquid crystal display includes a gate line 121, a data line 171h, a data line 171l, and a pixel area PX defined by these lines 121, 171h, and 171l. The pixel area PX may include a first sub-pixel area PXa and a second sub-pixel area PXb respectively corresponding to two sub-pixel electrodes.

The gate line 121 may transfer gate signals. The data line 171h and the data line 171l may transfer different voltages, respectively.

A first switching element Qh is connected to the gate line 121 and the first data line 171h. A second switching element Ql is connected to the gate line 121 and the second data line 171l.

A first liquid crystal capacitor Clch is connected to the first switching element Qh and is located in the first sub-pixel area PXa. A second liquid crystal capacitor Clcl is connected to the second switching element Ql and is located in the second sub-pixel area PXb.

A first terminal (e.g., gate terminal) of the first switching element Qh is connected to the gate line 121, a second terminal (e.g., source terminal) of the first switching element Qh is connected to the first data line 171h, and a third terminal (e.g., drain terminal) of the first switching element Qh is connected to the first liquid crystal capacitor Clch.

A first terminal of the second switching element Ql is connected to the gate line 121, a second terminal of the second switching element Ql is connected to the second data line 171*l*, and a third terminal of the second switching element Ql is connected to the second liquid crystal capacitor Clcl.

If a gate-on voltage is applied to the gate line 121, each of the first switching element Qh and the second switching element Ql enters a turn-on state, and the liquid crystal capacitors Clch and Clcl are charged by different data voltages transferred through the data lines 171*h* and 171*l*. The data voltage transferred by the second data line 171*l* may be lower than the data voltage transferred by the first data line 171*h*. Accordingly, the second liquid crystal capacitor Clcl is charged by lower voltage than that of the first liquid crystal capacitor Clch. As a result, satisfactory side visibility associated with the liquid crystal display can be achieved.

Figure 2:
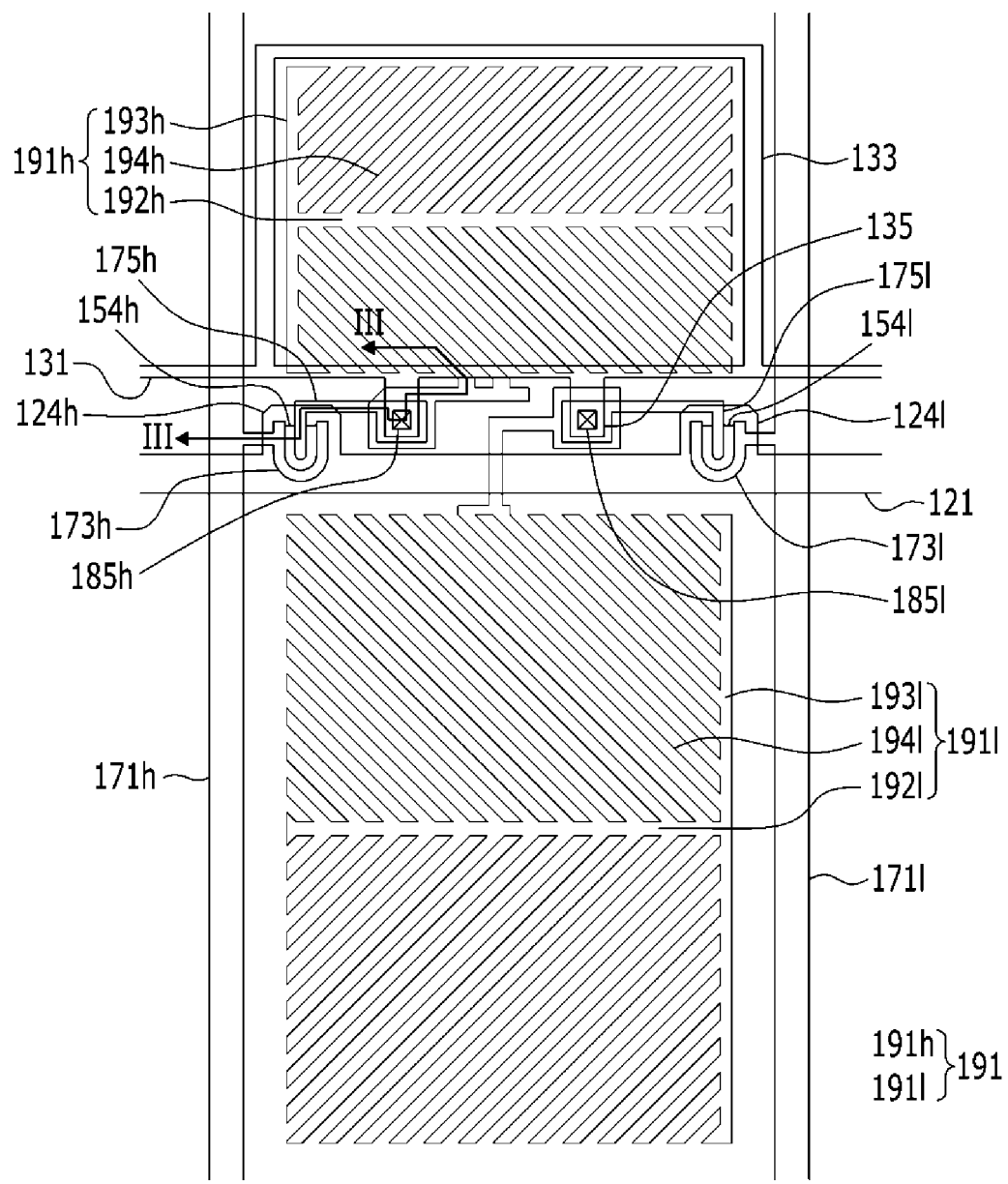
FIG. 2 is a schematic plan view illustrating elements and/or structures in a pixel of a liquid crystal display according to an embodiment.
Figure 3:
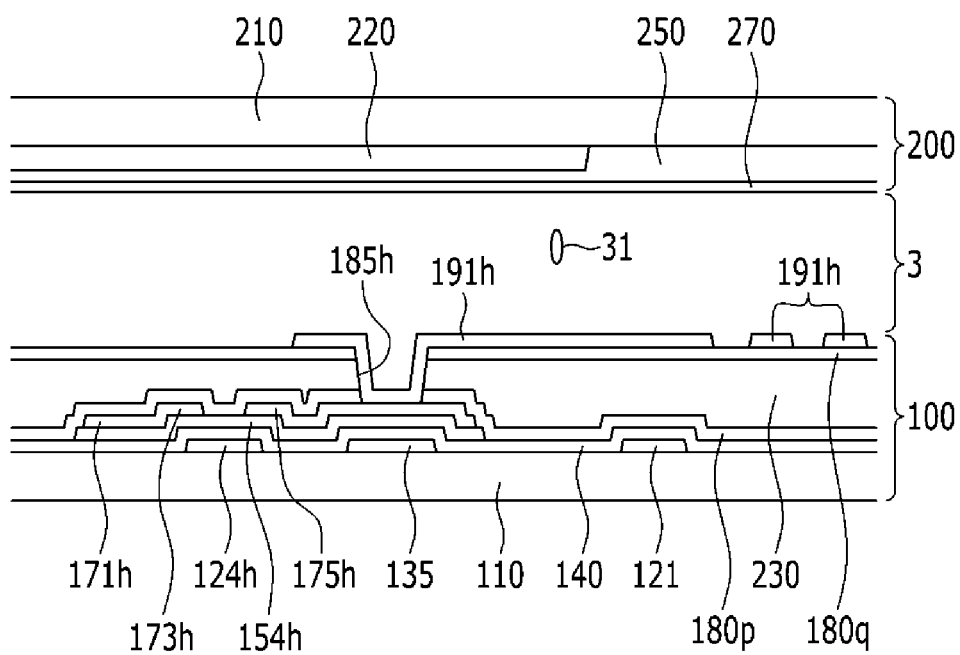
FIG. 3 is a schematic cross-sectional view taken along line III-III indicated in FIG. 2 according to an embodiment.
Figure 4:
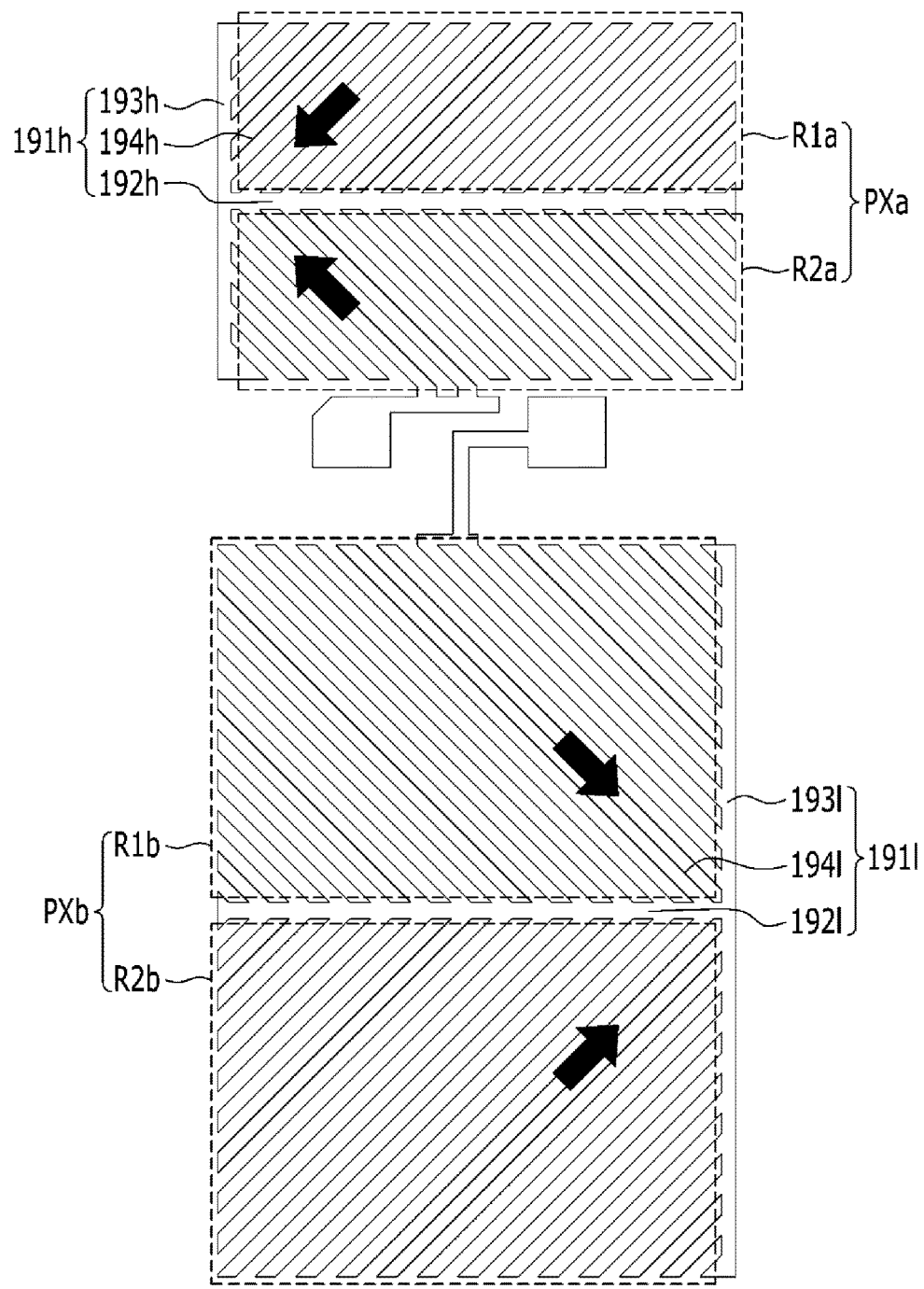
FIG. 4 is a schematic plan view illustrating some elements illustrated in FIG. 2 according to an embodiment.

FIG. 2 is a schematic plan view illustrating elements and/or structures in a first pixel of the liquid crystal display according to an embodiment. FIG. 3 is a schematic cross-sectional view taken along a line III-III line indicated in in FIG. 2. FIG. 4 is a schematic plan view illustrating sub-pixel electrodes in the first pixel of the liquid crystal display according to an embodiment.

Referring to FIG. 2 to FIG. 4, the liquid crystal display includes a lower panel 100, an upper panel 200, and a liquid crystal layer 3 interposed between these two panels 100 and 200. A gate line 121, a first gate electrode 124*h*, and a second gate electrode 124*l* are positioned (and/or formed) on a first substrate 110. The gate electrodes may protrude from the gate line 121. The first substrate 110 may be made of at least one of transparent glass, plastic, etc.

The gate line 121 primarily extends in a horizontal direction (when the liquid crystal display is in a standing or hung position) and may transfer gate signals.

A sustain electrode line 131 (or storage electrode line 131) and sustain electrodes 133 and 135 (which protrude from the sustain electrode line 131) may be positioned (and/or formed) on the substrate 110.

The sustain electrode line 131 may extend substantially parallel to the gate line 121 and may be spaced from the gate line 121. A predefined voltage may be applied to the sustain electrode line 131. The sustain electrode 133 may protrude from a first side of the sustain electrode line 131 and may surround a first sub-pixel electrode 191*h* a plan view of the liquid crystal display. The sustain electrodes 135 may protrude from a second side of the sustain electrode line 131 and may overlap a first drain electrode 175*h* and a second drain electrode 175*l*.

A gate insulating layer 140 may be positioned (and/or formed) on the first gate electrode 124*h*, the second gate electrode 124*l*, the sustain electrode line 131, the sustain electrodes 133 and 135, and the gate line 121. The gate insulating layer 140 may be formed of an inorganic insulating material such as, at least one of a silicon nitride (SiNx), a silicon oxide (SiOx), etc. The gate insulating layer 140 may have a single layer structure or a multilayer structure.

A first semiconductor 154*h* and a second semiconductor 154*l* are positioned (and/or formed) on the gate insulating layer 140. The first semiconductor 154*h* may be located on the first gate electrode 124*h*, and the second semiconductor 154*l* may be located on the second gate electrode 124*l*. The first semiconductor 154*h* may also be located under the first data line 171*h*, and the second semiconductor 154*l* may also be formed under the second data line 171*l*. Each of the first semiconductor 154*h* and the second semiconductor 154*l* may be formed of at least one of amorphous silicon, polycrystalline silicon, a metal oxide, etc.

Ohmic contact members may be further formed on the first semiconductor 154*h* and the second semiconductor 154*l*, respectively. The ohmic contact members may be formed of a silicide or n+ hydrogenated amorphous silicon doped with an n-type impurity in high concentration.

The first data line 171*h*, a first source electrode 173*h*, and the first drain electrode 175*h* are positioned (and/or formed) on the first semiconductor 154*h*. The second data line 171*l*, a second source electrode 173*l*, and the second drain electrode 175*l* are positioned (and/or formed) on the second semiconductor 154*l*.

The first data line 171*h* and the second data line 171*l* may transfer data signals, primarily extend in a vertical direction (when the liquid crystal display is in a standing or hung position), and may intersect the gate line 121 and the storage electrode line 131.

The first data line 171*h* and the second data line 171*l* may transfer different data voltages. For example, the data voltage transferred by the second data line 171*l* may be lower than the data voltage transferred by the first data line 171*h*.

The first source electrode 173*h* may protrude from the first data line 171*h* above the first gate electrode 124*h*. The second source electrode 173*l* may protrude from the second data line 171*l* above the second gate electrode 124*l*. Each of the first drain electrode 175*h* and the second drain electrode 175*l* may include a wide end portion and a relatively narrower rod-shaped portion. The wide end portions of the first drain electrode 175*h* and the second drain electrode 175*l* overlap the sustain electrodes 135. The rod-shaped portions of the first drain electrode 175*h* and the second drain electrode 175*l* may be partially surrounded by the first source electrode 173*h* and the second source electrode 173*l*, respectively.

The gate electrodes 124*h* and 124*l*, the source electrodes 173*h* and 173*l*, the electrodes 175*h* and 175*l*, and the semiconductors 154*h* and 154*l* may form the thin film transistors (TFT) Qh and Ql. A channel of the thin film transistor Qh is positioned in the semiconductor 154*h* and is positioned between the electrodes 173*h* and 175*h*. A channel of the thin film transistor Ql is positioned in the semiconductor 154*l* and is positioned between the electrodes 173*l* and 175*l*.

A first passivation layer 180*p* is positioned (and/or formed) on the first data line 171*h*, the second data line 171*l*, the first source electrode 173*h*, the first drain electrode 175*h*, a portion of the first semiconductor 154*h* exposed between the first source electrode 173*h* and the first drain electrode 175*h*, the second source electrode 173*l*, the second drain electrode 175*l*, and a portion of the second semiconductor 154*l* exposed between the second source electrode 173*l* and the second drain electrode 175*l*. The first passivation layer 180*p* may be formed of an inorganic insulating material, such as at least one of a silicon nitride (SiNx), a silicon oxide (SiOx), etc.

A color filter 230 is positioned (and/or formed) on the first passivation layer 180*p*. A relatively longer side of the color filter 230 may extend in a pixel column direction.

Each color filter 230 may display one of primary colors, such as one of red, green, blue. Each color filter 230 may display one of cyan, magenta, yellow, a white-based color, etc.

A second passivation layer 180*q* is formed on the color filter 230. The second passivation layer 180*q* may be formed of an inorganic insulating material, such as at least one of a silicon nitride (SiNx), a silicon oxide (SiOx), etc.

In an embodiment, the color filter 230 may be formed in the upper panel 200. In an embodiment, the second passivation layer 180q may be omitted.

Through the first passivation layer 180p, the color filter 230, and the second passivation layer 180q, a first contact hole 185h may expose the wide end portion of the first drain electrode 175h, and a second contact hole 185l may exposed the wide end portion of the second drain electrode 175l.

A pixel electrode 191 is formed on the second passivation layer 180q. The pixel electrode 191 may be formed of a transparent metal oxide, such as at least one of indium tin oxide (ITO), indium zinc oxide (IZO), etc.

The pixel electrode 191 includes a first sub-pixel electrode 191h and a second sub-pixel electrode 191l. The first sub-pixel electrode 191h is located in the first sub-pixel area PXa, and the second sub-pixel electrode 191l is located in the second sub-pixel area PXb.

The first sub-pixel electrode 191h is connected to the first drain electrode 175h through the first contact hole 185h, and the second sub-pixel electrode 191l is connected to the second drain electrode 175l through the second contact hole 185l. Accordingly, when the first thin film transistor Qh and the second thin film transistor Ql are turned on, different data voltages are applied to the first sub-pixel electrode 191h and the second sub-pixel electrode 191l from the first drain electrode 175h and the second drain electrode 175l, respectively.

The overall shape of each of the first sub-pixel electrode 191h and the second sub-pixel electrode 191l is substantially quadrangular. The first sub-pixel electrode 191h and the second sub-pixel electrode 191l include horizontal stem parts 192h and 192l, respectively, and vertical stem parts 193h and 193l, respectively. In addition, the first sub-pixel electrode 191h and the second sub-pixel electrode 191l further includes fine branch parts 194h and 194l, respectively, which extend from the horizontal stem parts 192h and 192l and the vertical stem parts 193h and 193l.

The horizontal stem parts 192h and 192l primarily extend in a horizontal direction (when the liquid crystal display is in a standing or hung position) and extend substantially parallel to the gate line 121. The horizontal stem parts 192h and 192l are located at the centers of the first sub-pixel area PXa and the second sub-pixel area PXb, respectively. The first sub-pixel area PXa and the second sub-pixel area PXb are divided into upper areas R1a and R1b and lower areas R2a and R2b by the horizontal stem parts 192h and 192l.

The vertical stem parts 193h and 193l primarily extend in a vertical direction (when the liquid crystal display is in a standing or hung position) and extend substantially parallel to the data lines 171h and 171l. The vertical stem parts 193h and 193l are respectively located at an edge of the first sub-pixel area PXa and at an edge of the second sub-pixel area PXb. In an embodiment, the vertical stem parts 193h and 193l are respectively located at a left edge of the first sub-pixel area PXa and at a right edge of the second sub-pixel area PXb. In an embodiment, vertical stem parts 193h and 193l are respectively located at a right edge of the first sub-pixel area PXa and a left edge of the second sub-pixel area PXb. The locations of vertical stem parts 193h and 193l are different in the first sub-pixel area PXa and the second sub-pixel area PXb.

The vertical stem part 193h may be positioned between the horizontal stem part 192h and the data line 171h in a plan view of the liquid crystal display. The vertical stem part 193l may be positioned between the horizontal stem part 192l and the data line 171l in the plan view of the liquid crystal display.

The vertical stem parts 193h and 193l are respectively directly connected to end parts of the horizontal stem parts 192h and 192l. The vertical stem part 193h of the first sub-pixel electrode 191h is directly connected to a left end part of the horizontal stem part 192h. The vertical stem part 193l of the second sub-pixel electrode 191l is directly connected to a right end part of the horizontal stem part 192l.

The fine branch parts 194h and 194l extend in one or more oblique directions with respect to the horizontal stem parts 192l and 192l and the vertical stem parts 193h and 193l. The fine branch parts 194h and 194l may be oriented at one or more acute angles in a range of about 40 degrees to about 50 degrees with respect to the horizontal stem parts 192h and 192l. Extension directions of the fine branch parts 194h in the upper area R1a of the first sub-pixel area PXa may be different from the extension directions of the fine branch parts 194l in the upper area R1b of the second sub-pixel area PXb. Extension directions of the fine branch parts 194h in the lower area R2a of the first sub-pixel area PXa may be different from the extension directions of the fine branch parts 194l in the lower area R2b of the second sub-pixel area PXb.

For example, the fine branch parts 194h and 194l may have the following orientations when the liquid crystal display device is in a standing or hung position: In the upper area R1a of the first sub-pixel area PXa, the fine branch parts 194h may extend in an upper right direction from the horizontal stem part 192h and the vertical stem part 193l. In the lower area R2a of the first sub-pixel area PXa, the fine branch parts 194h may extend in a lower right direction from the horizontal stem part 192h and the vertical stem part 193l. In the upper area R1a of the second sub-pixel area PXb, the fine branch parts 194l may extend in an upper left direction from the horizontal stem part 192l and the vertical stem part 193l. In the lower area R2b of the second sub-pixel area PXb, the fine branch parts 194 may extend in a lower left direction from the horizontal stem part 192l and the vertical stem part 193l.

The extension directions of the fine branch parts 194h and 194l in the upper areas R1a and R1b and the extension direction of the fine branch parts 194h and 194l in the lower areas R2a and R2b are symmetrical with respect to the horizontal stem parts 192h and 192l. The fine branch parts 191h are positioned between the vertical stem part 193h and the data line 171l. The fine branch parts 191h include first-set branch electrodes and second-set branch electrodes. The fine branch parts 191l are positioned between the vertical stem part 193l and the data line 171h. The fine branch parts 191l include third-set branch electrodes and fourth-set branch electrodes. The second-set branch electrodes are positioned between the first-set branch electrodes and the third-set branch electrodes. The third-set branch electrodes are positioned between the second-set branch electrodes and the fourth-set branch electrodes.

The first-set branch electrodes may be oriented at a first acute angle with respect to the horizontal stem part 192h. The second-set branch electrodes may be oriented at a second acute angle with respect to the horizontal stem part 192h. The first acute angle may be equal to the second acute angle. The first-set branch electrodes may be symmetrical to second-set branch electrodes with reference to the horizontal stem part 192h.

The third-set branch electrodes may be oriented at a third acute angle with respect to the horizontal stem part 192l. The fourth-set branch electrodes may be oriented at a fourth acute angle with respect to the horizontal stem part 192l. The third acute angle may be equal to the fourth acute angle. The third-set branch electrodes may be symmetrical to fourth-set branch electrodes with reference to the horizontal stem part 192*l*.

A light blocking member 220 is positioned (and/or formed) on a second substrate 210. The second substrate 210 may be made of at least one of transparent glass, plastic, etc. The light blocking member 220 may be a black matrix and may substantially prevent light leakage. The light blocking member 220 may overlap the gate line 121, the data lines 171*h* and 171*l*, and the thin film transistors Qh and Ql.

An overcoat 250 may be positioned (and/or formed) on the light blocking member 220. The overcoat 250 may provide a substantially flat surface over the second substrate 210.

A common electrode 270 is positioned (and/or formed) on the overcoat 250. The common electrode 270 may be formed of a transparent metal oxide, such as at least one of indium tin oxide (ITO), indium zinc oxide (IZO), etc. The common electrode 270 may substantially cover the second substrate 210.

The liquid crystal layer 3 may include a plurality of liquid crystal molecules 31 having negative dielectric anisotropy.

When predetermined voltages are applied to the pixel electrode 191 and the common electrode 270, an electric field is formed between the lower panel 100 and the upper panel 200. The electric field includes a vertical component oriented in a substantially vertical direction with respect to the surfaces of the lower panel 100 and the upper panel 200, which may orient liquid crystal molecules 31 in a substantially horizontal direction with respect to the lower panel 100 and the upper panel 200.

Fringe fields may be formed between the edges of the horizontal stem parts 192*h* and 192*l*, the vertical stem parts 193*h* and 193*l*, the fine branch parts 194*h* and 194*l*, and the common electrode 270, which may orient liquid crystal molecules 31 in directions illustrated by the arrows shown in FIG. 4.

Figure 5:
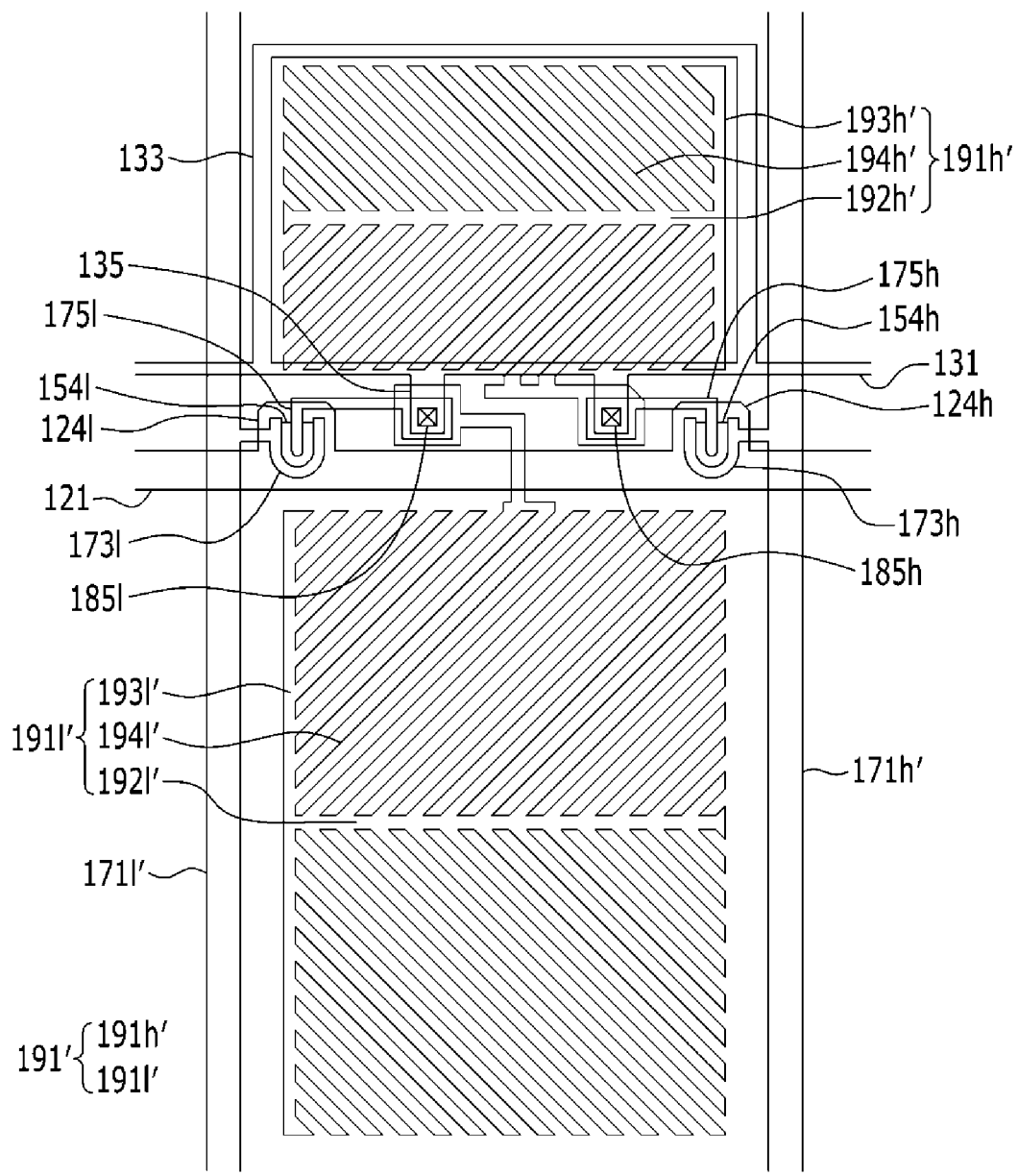
FIG. 5 is a schematic plan view illustrating a pixel of a liquid crystal display according to an embodiment.
Figure 6:
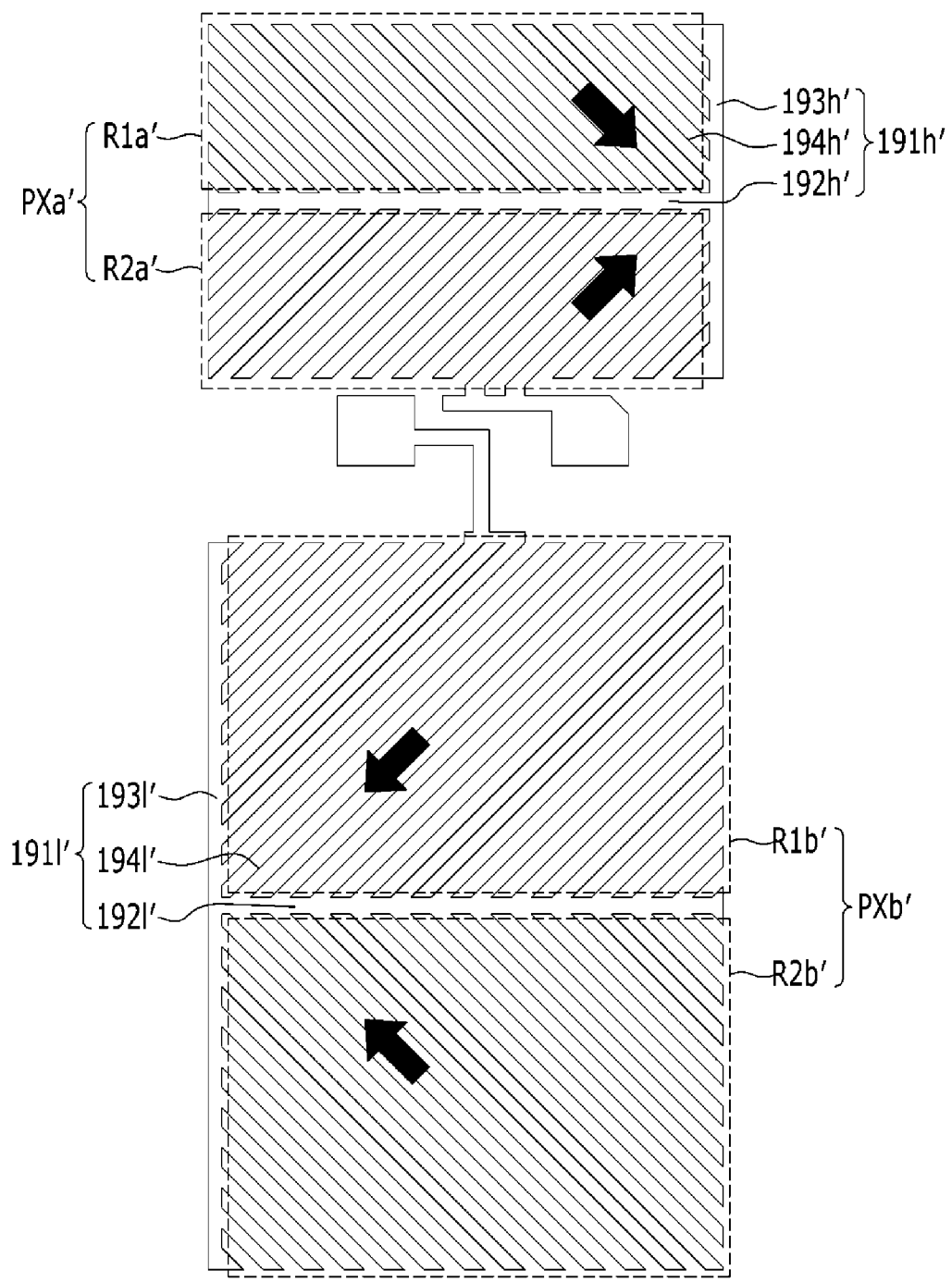
FIG. 6 is a schematic plan view illustrating some elements illustrated in FIG. 5 according to an embodiment.

In the upper area R1*a* of the first sub-pixel area PXa, the liquid crystal molecules 31 incline in the lower left direction. In the lower area R2*a* of the first sub-pixel area PXa, the liquid crystal molecules 31 incline in the upper left direction. In the upper area R1*b* of the second sub-pixel area PXb, the liquid crystal molecules 31 incline in the lower right direction. In the lower area R2*b* of the second sub-pixel area PXb, the liquid crystal molecules 31 incline in the upper right direction. FIG. 5 is a schematic plan view illustrating elements and/or structures in a second pixel of the liquid crystal display according to an embodiment. FIG. 6 is a schematic plan view illustrating sub-pixel electrodes in the second of the liquid crystal display according to an embodiment. The second pixel may include features that are analogous to or identical to some of the features of the first pixel discussed with reference to FIG. 2, FIG. 3, and FIG. 4. Some elements of the second pixel may be substantially mirror images of some elements of the first pixel and/or may be symmetrical to some elements of the first pixel with reference to a geometric midpoint.

The pixel electrode 191' includes the first sub-pixel electrode 191*h*' and the second sub-pixel electrode 191*l*'. The first sub-pixel electrode 191*h*' and the second sub-pixel electrode 191*l*' include the horizontal stem parts 192*h*' and 192*l*', the vertical stem parts 193*h*' and 193*l*', and the fine branch parts 194*h*' and 194*l*'.

The horizontal stem parts 192*h*' and 192*l*' primarily extend in the horizontal direction and extend substantially parallel to the gate line 121. The horizontal stem parts 192*h*' and 192*l*' are respectively located at the centers of the first sub-pixel area PXa' and the second sub-pixel area PXb'. The first sub-pixel area PXa' and the second sub-pixel area PXb' are divided into the upper areas R1*a*' and R1*b*' and the lower areas R2*a*' and R2*b*'.

The vertical stem parts 193*h*' and 193*l*' primarily extended in the vertical direction and extend substantially parallel to the data lines 171*h*' and 171*l*'. The vertical stem parts 193*h*' and 193*l*' are respectively located at an edge of the first sub-pixel area PXa' and at an edge of the second sub-pixel area PXb'. In an embodiment, as illustrated in FIG. 6, the vertical stem parts 193*h*' and 193*l*' are respectively located at a right edge of the first sub-pixel area PXa' and at a left edge of the second sub-pixel area PXb'; in contrast, as illustrated in FIG. 4, the vertical stem parts 193*h* and 193*l* are respectively located at a left edge of the first sub-pixel area PXa and at a right edge of the second sub-pixel area PXb. In the first sub-pixel area PXa' and the second sub-pixel area PXb', the locations of vertical stem parts 193*h*' and 193*l*' are different.

The vertical stem part 193*h*' may be positioned between the horizontal stem part 192*h*' and the data line 171*h*' in a plan view of the liquid crystal display. The vertical stem part 193*l*' may be positioned between the horizontal stem part 192*l*' and the data line 171*l*' in the plan view of the liquid crystal display. In an embodiment, the data lines 171*l* and 171*l*' are positioned between the data lines 171*h* and 171*h*'. In and embodiment, the data lines 171*h* and 171*h*' are positioned between the data lines 171*l* and 171*l*'.

The vertical stem parts 193*h*' and 193*l*' are respectively directly connected to end parts of the horizontal stem parts 192*h*' and 192*l*'. The vertical stem part 193*h*' of the first sub-pixel electrode 191*h*' is directly connected to a right end part of the horizontal stem part 192*h*'. The vertical stem part 193*l*' of the second sub-pixel electrode 191*l*' is directly connected to a left end part of the horizontal stem part 192*l*'.

The fine branch parts 194*h*' and 194*l*' extend in one or more oblique directions with respect to the horizontal stem parts 192*l*' and 192*l*' and the vertical stem parts 193*h*' and 193*l*'. The fine branch parts 194*h*' and 194*l*' may be oriented at one or more acute angles in a range of about 40 degrees to about 50 degrees with respect to the horizontal stem parts 192*h*' and 192*l*'. Extension directions of the fine branch parts 194*h* in the upper area R1*a*' of the first sub-pixel area PXa' may be different from the extension directions of the fine branch parts 194*l*' in the upper area R1*b*' of the second sub-pixel area PXb'. Extension directions of the fine branch parts 194*h*' in the lower area R2*a*' of the first sub-pixel area PXa' may be different from the extension directions of the fine branch parts 194*l*' in the lower area R2*b*' of the second sub-pixel area PXb'.

For example, the fine branch parts 194*h* and 194*l* may have the following orientations when the liquid crystal display device is in a standing or hung position: In the upper area R1*a* of the first sub-pixel area PXa, the fine branch parts 194*h* may extend in the upper left direction from the horizontal stem part 192*h* and the vertical stem part 193*l*. In the lower area R2*a* of the first sub-pixel area PXa, the fine branch parts 194*h* may extend in the lower left direction from the horizontal stem part 192*h* and the vertical stem part 193*l*. In the upper area R1*a* of the second sub-pixel area PXb, the fine branch parts 194*l* may extend in the upper right direction from the horizontal stem part 192*l* and the vertical stem part 193*l*. In the lower area R2*b* of the second sub-pixel area PXb, the fine branch parts 194 may extend in the lower right direction from the horizontal stem part 192*l* and the vertical stem part 193*l*.

The fine branch parts 194*h*' may be mirror images of the fine branch parts 194*h*. The fine branch parts 194*l*' may be mirror images of the fine branch parts 194*l*.

Figure 7:
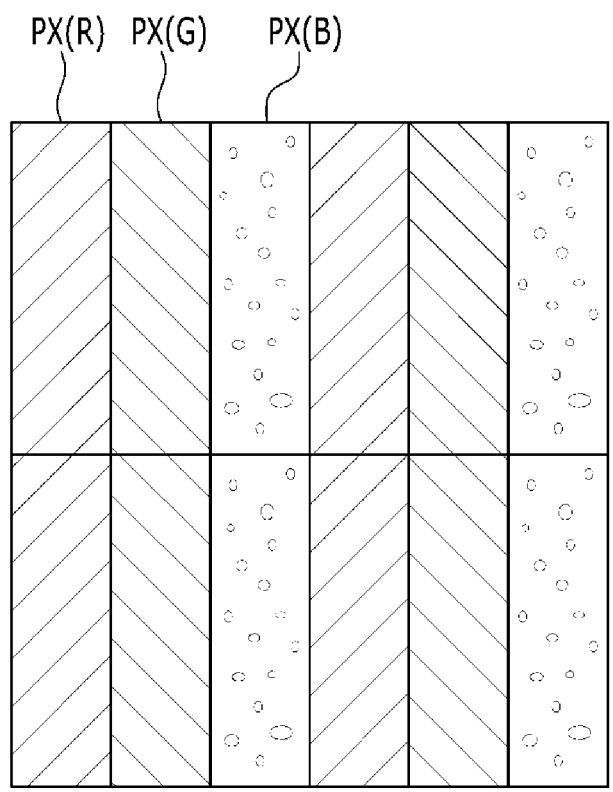
FIG. 7 is a schematic plan view illustrating a plurality of pixel areas of a liquid crystal display according to an embodiment.

Referring to the inclined directions of liquid crystal molecules 31 denoted by arrows in FIG. 6, the liquid crystal molecules 31 incline in the lower right direction in the upper area R1*a*' of the first sub-pixel area PXa'. In the lower area R2*a*' of the first sub-pixel area PXa', the liquid crystal molecules 31 incline in the upper right direction. In the upper area R1*b*' of the second sub-pixel area PXb', the liquid crystal molecules 31 incline in the lower left direction. In the lower area R2*b*' of the second sub-pixel area PXb, the liquid crystal molecules 31 incline in the upper left direction. FIG. 7 is a schematic plan view illustrating a plurality of pixel areas of the liquid crystal display according to an embodiment.

Referring to FIG. 7, the liquid crystal display according to an embodiment includes a plurality of pixel areas PX, and the plurality of pixel areas PX is arranged in a matrix shape. The plurality of pixel areas PX are arranged in pixel columns in a column direction and pixel rows in a row direction.

The plurality of pixel areas PX include a plurality of first-color pixel areas PX(R), a plurality of second-color pixel areas PX(G), and a plurality of third-color pixel areas PX(B). The first-color pixel areas PX(R) may include red pixel areas, the second-color pixel areas PX(G) may include green pixel areas, and the third-color pixel areas PX(B) may include blue pixel areas. Colors of pixel areas PX may be configured differently in various embodiments.

A plurality of first color pixel areas PX(R) is arranged in the column direction. A plurality of second color pixel areas PX(G) is arranged in the column direction. A plurality of third color pixel areas PX(B) is arranged in the column direction. A first-color pixel area PX(R) column may immediately neighbor a second-color pixel area PX(G) column in the row direction. The second-color pixel area PX(G) column may immediately neighbor a third-color pixel area PX(B) column in the row direction. The third-color pixel area PX(B) column may immediately neighbor a first-color pixel area PX(R) column in the row direction.

Figure 8:
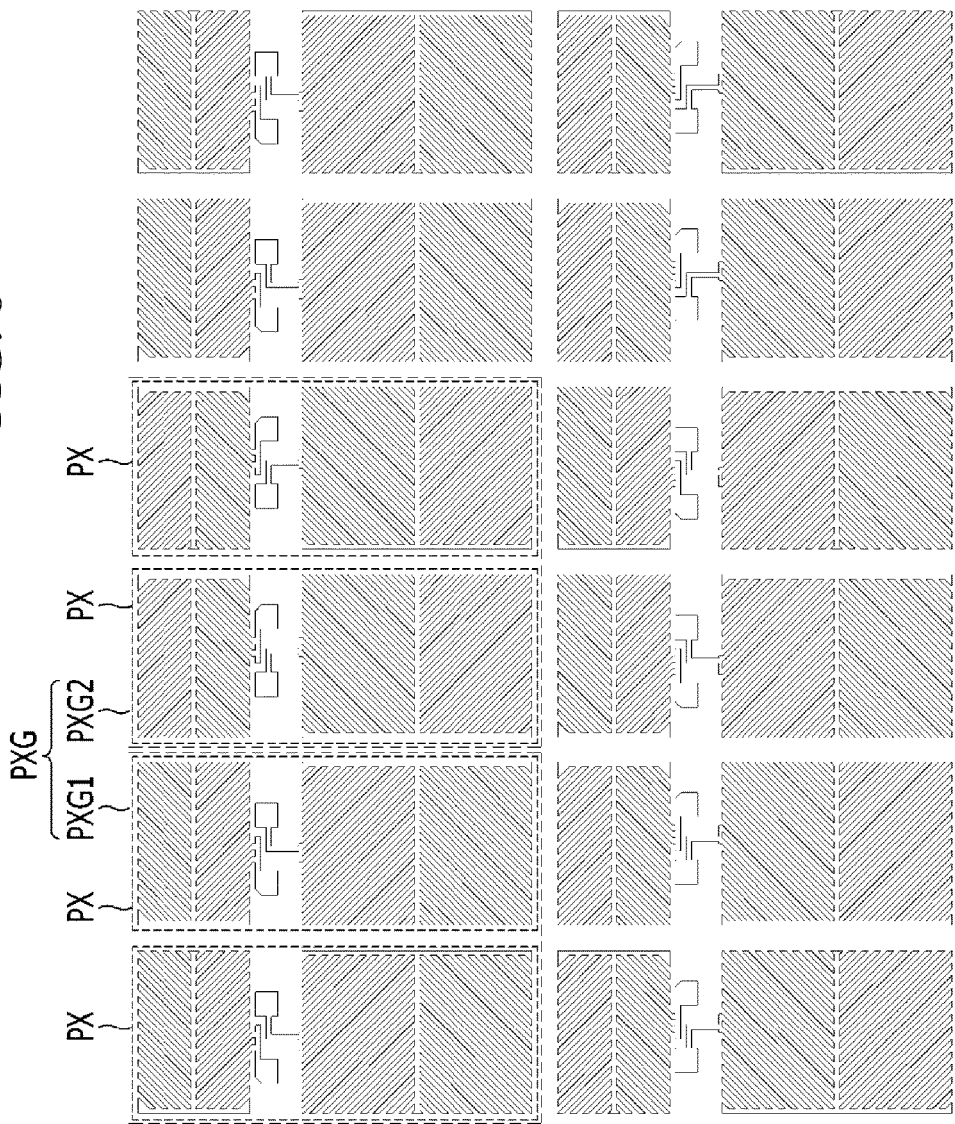
FIG. 8 is a schematic plan view illustrating a plurality of pixel electrodes of a liquid crystal display according to an embodiment.

Pixel areas PX of the same color may be arranged in the column direction. Pixel areas PX of different colors may immediately neighbor each other in the row direction. FIG. 8 is a schematic plan view illustrating a plurality of pixel electrodes of a liquid crystal display according to an embodiment.

Referring to FIG. 8, the liquid crystal display includes a plurality of pixel areas PX, and a pixel electrode 191 or 191' is positioned in each of the pixel areas PX.

A plurality of pixel areas PX may be grouped to form a pixel group PXG. In an embodiment, each pixel group PXG may consist of an even number of pixel areas PX. For example, the pixel groups PXG may include a first pixel group PXG1 and a second pixel group PXG2. Two pixel areas PX are grouped to form the first pixel group PXG1. Another two pixel areas PX adjacent to the first pixel group PXG1 are grouped to form the second pixel group PXG2. For example, the first pixel group PXG1 may include a first-color pixel area PX(R) and a second-color pixel area PX(G), and the second pixel group PXG2 may include a third-color pixel area PX(B) and a first-color pixel area PX(R).

A pixel group PXG may include two pixel areas PX that are immediately adjacent in the row direction. Each of the first pixel group PXG1 and the second pixel group PXG2 includes two pixel areas PX that are immediately adjacent in the row direction. The first pixel group PXG1 and the second pixel group PXG2 are immediately adjacent to each other.

The first pixel group PXG1 includes two pixel areas PX, and extension directions of the fine branch parts 194*h* and 194*l* of the two pixel electrodes 191 of the two pixel areas PX are identical. Two pixel electrodes 191 illustrated in FIG. 4 are included in the first pixel group PXG1. In the first pixel group PXG1, an extension direction of the fine branch parts 194*h* and 194*l* of the pixel electrode 191 in the left pixel area PX is the same as an extension direction of the fine branch parts 194*h* and 194*l* of the pixel electrode 191 in the right pixel area PX. In an embodiment, in a pixel group PXG, an extension direction of the fine branch parts 194*h* and 194*l* of one pixel electrode 191 is the same as an extension direction of the fine branch parts 194*h* and 194*l* of another pixel electrode 191.

The second pixel group PXG2 includes two pixel areas PX, and extension directions of the fine branch parts 194*h*' and 194*l*' of the two pixel electrode 191' of the two pixel areas PX are identical. The second pixel group PXG2 may include two pixel electrodes 191' illustrated in FIG. 6. An extension direction of the fine branch parts 194*h*' and 194*l*' of the pixel electrode 191' located in the second pixel group PXG2 is different from an extension direction of the fine branch parts 194*h* and 194*l* of the pixel electrode 191 located in the first pixel group PXG1, which immediately neighbors the second pixel group PXG2. In an embodiment, an extension direction of the fine branch parts in a pixel group PXG is different from an extension direction of fine branch parts 194*h* and 194*l* in an immediately neighboring pixel group PXG. In an embodiment, pixel electrodes of a pixel group PXG are mirror images of pixel electrodes of an immediately neighboring pixel group PXG.

Figure 9:
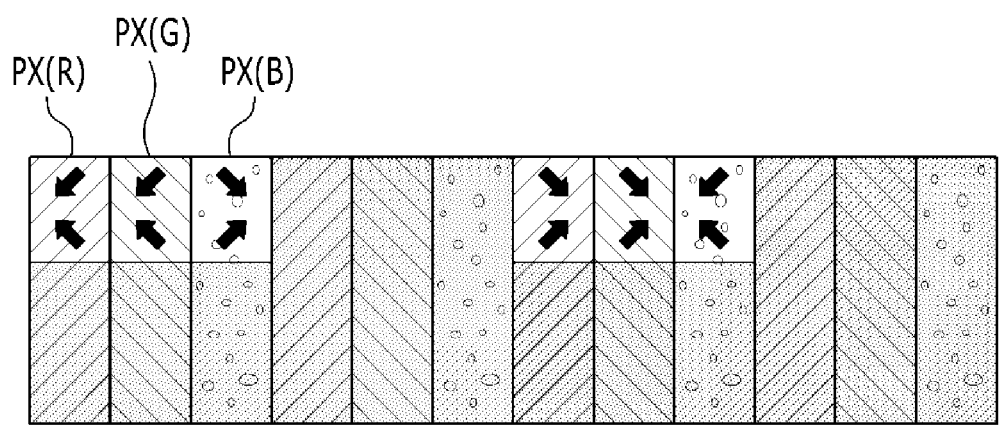
FIG. 9 is a schematic plan view illustrating inclined directions of liquid crystal molecules in a plurality of pixel areas of a liquid crystal display according to an embodiment.

FIG. 9 is a schematic plan view illustrating inclined directions of liquid crystal molecules in a plurality of pixel areas of the liquid crystal display according to an embodiment. In a checker pattern, a first-color pixel area, a second-color pixel area, and a third-color pixel area adjacent to each other are turned on simultaneously, and another three pixel areas adjacent to these pixel areas are turned off; this pattern is repeated. Under the mid-gray scale, second sub-pixel areas PXb and PXb', to which relatively low voltages are applied, are turned off, and only some first sub-pixel areas PXa and PXa' are turned on.

Referring to FIG. 9, in a first first-color pixel area PX(R), e.g., left turned-on first-color pixel area PX(R), liquid crystal molecules incline in the lower left direction and the upper left direction. In a second first-color pixel area PX(R), e.g., right turned-on first-color pixel area PX(R), liquid crystal molecule incline in the lower right direction and the upper right direction. The pixel area PX in which the liquid crystal molecules incline in the lower left direction and the upper left direction is displayed brighter in the left viewing angle, and the pixel area PX in which the liquid crystal molecules incline in the lower right direction and the upper right direction is displayed brighter in the right viewing angle. The luminance of first-color pixel areas PX(R) in the left viewing angle may be substantially equal to the luminance of first-color pixel areas PX(R) in the right viewing angle.

In a left turned-on second-color pixel area PX(G), the liquid crystal molecules incline in the lower left direction and the upper left direction. In a right turned-on second-color pixel area PX(G), the liquid crystal molecules incline in the lower right direction and the upper right direction. The luminance of second-color pixel areas PX(G) in the left viewing angle may be substantially equal to the luminance of second-color pixel areas PX(G) in the right viewing angle.

In a left turned-on third-color pixel area PX(B), the liquid crystal molecules incline in the lower right direction and the upper right direction. In a right turned-on third-color pixel area PX(B), the liquid crystal molecules incline in the lower left direction and the upper left direction. The luminance of third-color pixel areas PX(B) in the left viewing angle may be substantially equal to the luminance of third-color pixel areas PX(B) in the right viewing angle.

According to an embodiment, different inclined directions of liquid crystal molecules may be systematically distributed among first-color pixel areas PX(R), may be systematically distributed among second-color pixel areas PX(G), and may be systematically distributed among third-color pixel areas PX(B). Therefore, in an image displayed by the liquid crystal display, a luminance in the right viewing angel may be substantially equal to a luminance in the left viewing angle. Advantageously, satisfactory image viewing experience may be provided.

Figure 10:
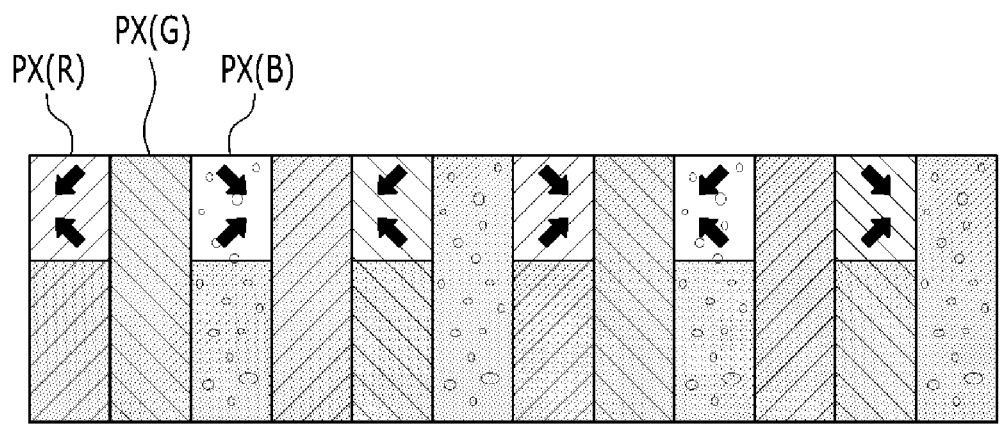
FIG. 10 is a schematic plan view illustrating inclined directions of liquid crystal molecules in a plurality of pixel areas of a liquid crystal display according to an embodiment.

FIG. 10 is a schematic plan view illustrating inclined directions of liquid crystal molecules in a plurality of pixel areas of a liquid crystal display according to an embodiment. In a sub-checker pattern, a pixel area is turned on and an immediately adjacent pixel area is turned off; this pattern is repeated. Under the mid-gray scale, second sub-pixel areas PXb and PXb', to which relatively low voltages are applied, are turned off, and only some first sub-pixel areas PXa and PXa' are turned on.

Referring to FIG. 10, a first first-color pixel area PX(R), e.g., left-most first-color pixel area PX(R), liquid crystal molecules incline in the lower left direction and the upper left direction. A second first-color pixel area PX(R) is turned off. In a third first-color pixel area PX(R), liquid crystal molecules incline in the lower right direction and the upper right direction. A fourth first-color pixel area PX(R) is turned off. Different inclined directions of liquid crystal molecules may be systematically distributed the among first-color pixel areas PX(R). Therefore, the luminance of first-color pixel areas PX(R) in the left viewing angle may be substantially equal to the luminance of first-color pixel areas PX(R) in the right viewing angle.

A first second-color pixel area PX(G) is turned off. In a second second-color pixel area PX(G), liquid crystal molecules incline in the lower left direction and the upper left direction. A third second-color pixel area PX(G) is turned off. In a fourth second-color pixel area PX(G), liquid crystal molecules incline in the lower right direction and the upper right direction. The luminance of second-color pixel areas PX(R) in the left viewing angle may be substantially equal to the luminance of second-color pixel areas PX(G) in the right viewing angle.

In a first third-color pixel area PX(B), liquid crystal molecules incline in the lower right direction and the upper right direction. A second third-color pixel area PX(B) is turned off. In a third third-color pixel area PX(B), liquid crystal molecules incline in the lower left direction and the upper left direction. A fourth third-color pixel area PX(B) is turned off. The luminance of third-color pixel areas PX(B) in the left viewing angle may be substantially equal to the luminance of third-color pixel areas PX(B) in the right viewing angle.

Figure 11:
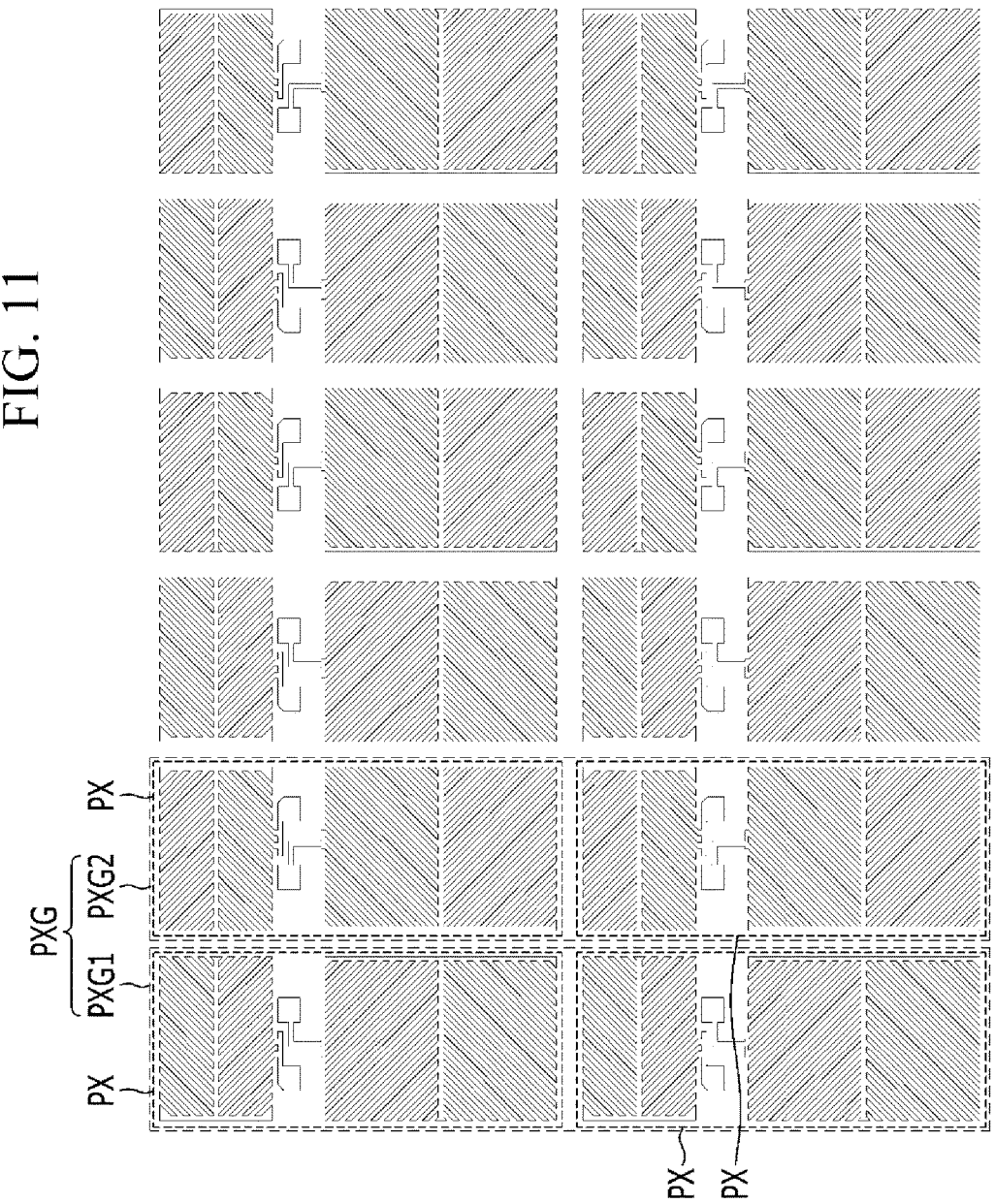
FIG. 11 is a schematic plan view illustrating a plurality of pixel electrodes of a liquid crystal display according to an embodiment.

According to an embodiment, different inclined directions of liquid crystal molecules may be systematically distributed among first-color pixel areas PX(R), may be systematically distributed among second-color pixel areas PX(G), and may be systematically distributed among third-color pixel areas PX(B). Therefore, in an image displayed by the liquid crystal display, a luminance in the right viewing angel may be substantially equal to a luminance in the left viewing angle. Advantageously, satisfactory image viewing experience may be provided. FIG. 11 is a schematic plan view illustrating a plurality of pixel electrodes of a liquid crystal display according to an embodiment. The liquid crystal display associated with FIG. 11 may have one or more of the features discussed above with reference to FIG. 1, FIG. 2, FIG. 3, FIG. 4, FIG. 5, FIG. 6, FIG. 7, and FIG. 8. Description related to identical or analogous features may not be repeated.

Referring to FIG. 11, the liquid crystal display includes a plurality of pixel areas, and a pixel electrode 191 or 191' is positioned in each pixel area PX.

A plurality of pixel areas PX may be grouped to form a pixel group PXG. In an embodiment, each pixel group PXG may consist of an even number of pixel areas PX that immediately neighbor each other in the column direction. For example, the pixel groups PXG may include a first pixel group PXG1 and a second pixel group PXG2.

Figure 12:
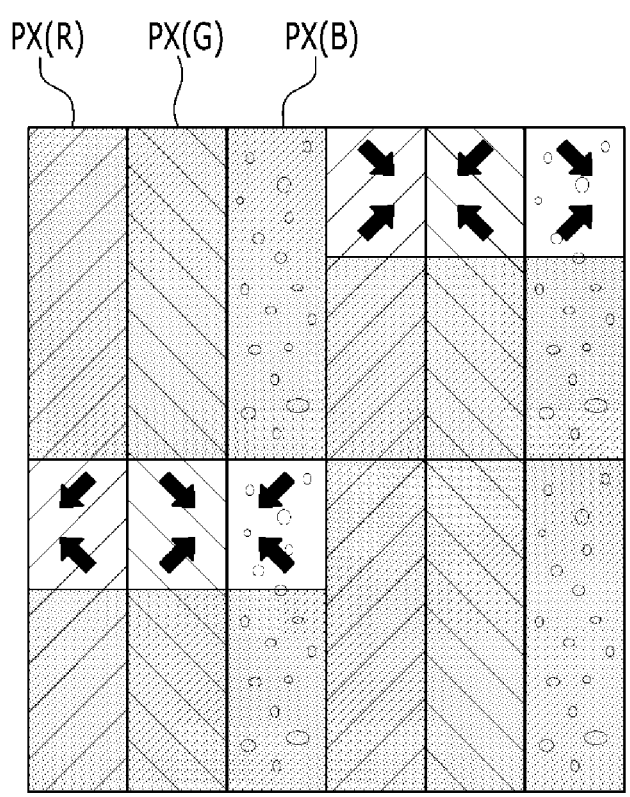
FIG. 12 is a schematic plan view illustrating inclined directions of liquid crystal molecules in a plurality of pixel areas of a liquid crystal display according to an embodiment.

In the pixel group PXG1, an extension direction of the fine branch parts 194*h* and 194*l* of one pixel electrode 191 is the same as an extension direction of the fine branch parts 194*h* and 194*l* of the other pixel electrode 191. In the pixel group PXG2, which immediately neighbors the pixel group PXG1, an extension direction of the fine branch parts 194*h*' and 194*l*' of one pixel electrode 191' is the same as an extension direction of the fine branch parts 194*h*' and 194*l*' of the other pixel electrode 191'. An extension direction of the fine branch parts 194*h* and 194*l* in the pixel group PXG1 is different from (an is a mirror image of) an extension direction of fine branch parts 194*h*' and 194*l*' in the immediately neighboring pixel group PXG2. FIG. 12 is a schematic plan view illustrating inclined directions of liquid crystal molecules in a plurality of pixel areas of the liquid crystal display according to an embodiment.

Referring to FIG. 12, in a first first-color pixel area PX(R), liquid crystal molecules incline in the lower left direction and the upper left direction. In a second first-color pixel area PX(R), liquid crystal molecules incline in the lower right direction and the upper right direction.

In a first second-color pixel area PX(G), liquid crystal molecules incline in the lower right direction and the upper right direction. In a second second-color pixel area PX(G), liquid crystal molecules incline in the lower left direction and the upper left direction.

In a first third-color pixel area PX(B), liquid crystal molecules incline in the lower left direction and the upper left direction. In a second third-color pixel area PX(B), liquid crystal molecules incline in the lower right direction and the upper right direction.

According to an embodiment, different inclined directions of liquid crystal molecules may be systematically distributed among first-color pixel areas PX(R), may be systematically distributed among second-color pixel areas PX(G), and may be systematically distributed among third-color pixel areas PX(B). Therefore, in an image displayed by the liquid crystal display, a luminance in the right viewing angel may be substantially equal to a luminance in the left viewing angle. Advantageously, satisfactory image viewing experience may be provided.

Figure 13:
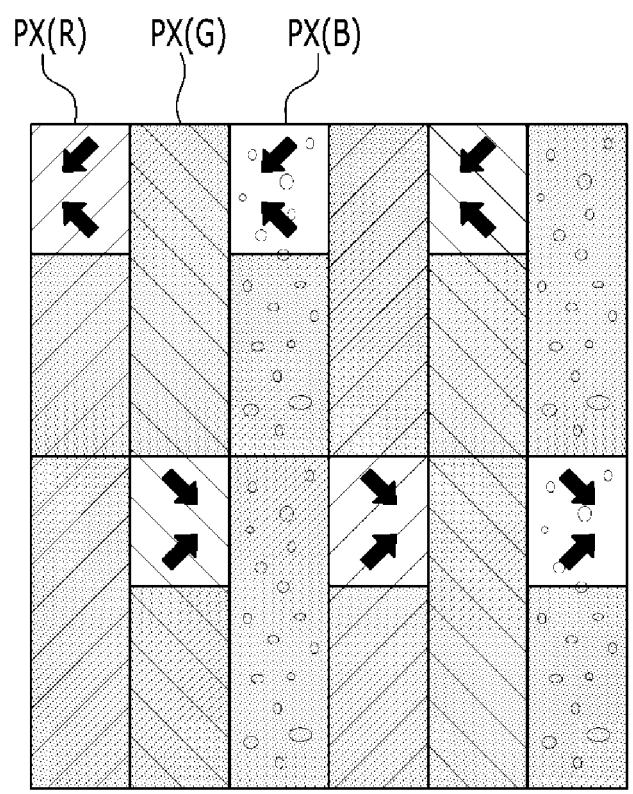
FIG. 13 is a schematic plan view illustrating inclined directions of liquid crystal molecules in a plurality of pixel areas of a liquid crystal display according to an embodiment.

FIG. 13 is a schematic plan view illustrating inclined directions of liquid crystal molecules in a plurality of pixel areas of the liquid crystal display according to an embodiment.

Referring to FIG. 13, in a first first-color pixel area PX(R), liquid crystal molecules incline in the lower left direction and the upper left direction. In a second first-color pixel area PX(R), liquid crystal molecules incline in the lower right direction and the upper right direction.

In a first second-color pixel area PX(G), liquid crystal molecules incline in the lower right direction and the upper right direction. In a second second-color pixel area PX(G), liquid crystal molecules incline in the lower left direction and the upper left direction.

In a first third-color pixel area PX(B), liquid crystal molecules incline in the lower left direction and the upper left direction. In a second third-color pixel area PX(B), liquid crystal molecules incline in the lower right direction and the upper right direction.

According to an embodiment, different inclined directions of liquid crystal molecules may be systematically distributed among first-color pixel areas PX(R), may be systematically distributed among second-color pixel areas PX(G), and may be systematically distributed among third-color pixel areas PX(B). Therefore, in an image displayed by the liquid crystal display, a luminance in the right viewing angel may be substantially equal to a luminance in the left viewing angle. Advantageously, satisfactory image viewing experience may be provided.

Figure 14:
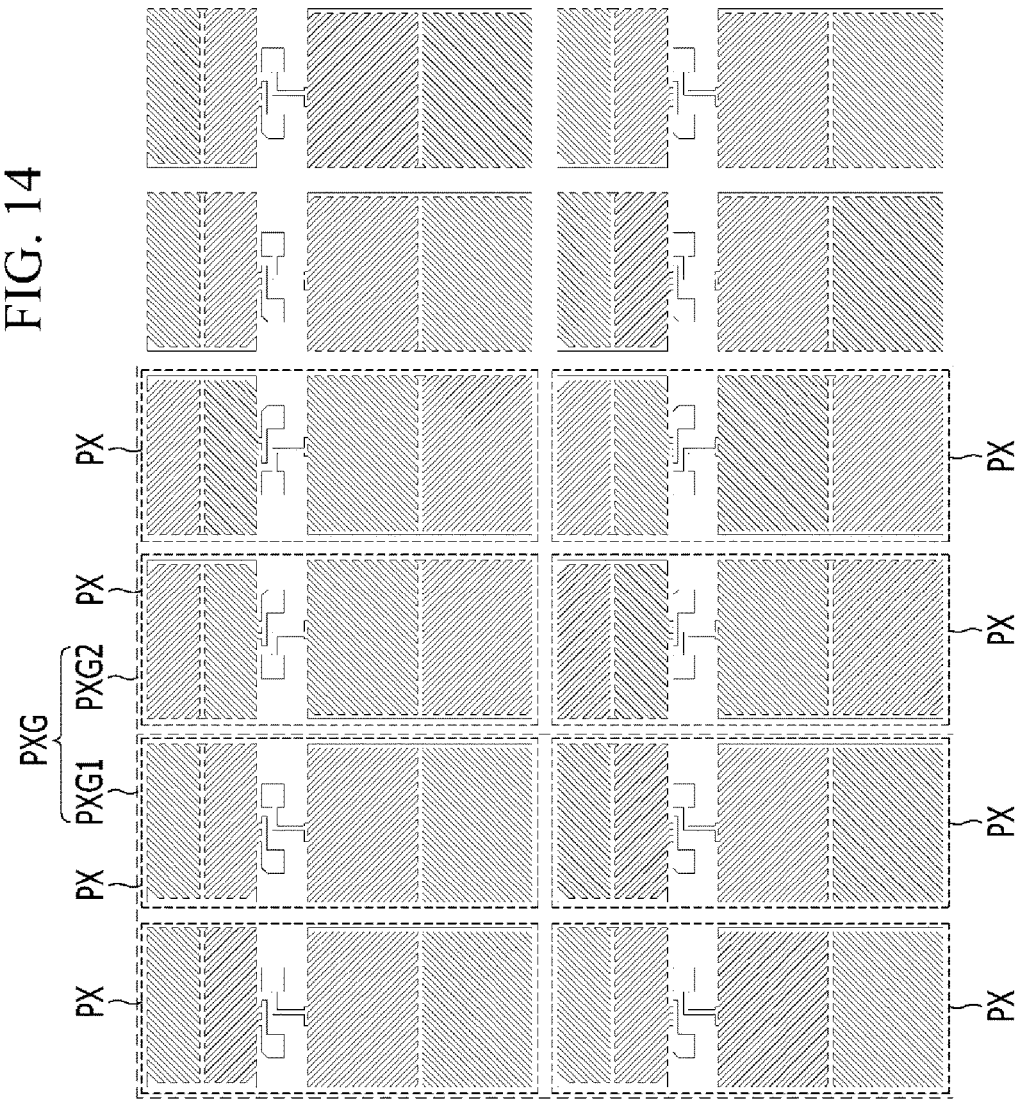
FIG. 14 is a schematic plan view illustrating a plurality of pixel electrodes of a liquid crystal display according to an embodiment.

FIG. 14 is a schematic plan view illustrating a plurality of pixel electrodes of a liquid crystal display according to an embodiment. The liquid crystal display associated with FIG. 14 may have one or more of the features discussed above with reference to FIG. 1, FIG. 2, FIG. 3, FIG. 4, FIG. 5, FIG. 6, FIG. 7, FIG. 8, FIG. 9, FIG. 10, FIG. 11, FIG. 12, and FIG. 13. Description related to identical or analogous features may not be repeated.

Referring to FIG. 14, the liquid crystal display includes a plurality of pixel areas, and a pixel electrode 191 or 191' is formed in each pixel area PX. A plurality of pixel areas PX, e.g., four pixel areas PX, may be group form a pixel group PXG. A pixel group PXG may include (and/or consist of) four consecutive pixel areas PX that are adjacent to each other in the column direction and the row direction. The four pixel areas PX in the pixel group PXG are arranged in a 2-by-2 array.

The pixel groups PXG include pixel groups PXG1 and PXG2. In the pixel group PXG1, extension directions of the fine branch parts 194*h* and 194*l* of one pixel electrode 191 are the same as extension directions of the fine branch parts 194*h* and 194*l* of the other three pixel electrodes 191. In the pixel group PXG2, which immediately neighbors the pixel group PXG1, extension directions of the fine branch parts 194*h*' and 194*l*' of one pixel electrode 191' is the same as extension directions of the fine branch parts 194*h*' and 194*l*' of the other three pixel electrodes 191'. An extension direction of the fine branch parts 194*h* and 194*l* in the pixel group PXG1 is different from an extension direction of fine branch parts 194*h* and 194*l* in the immediately neighboring pixel group PXG2.

According to an embodiment, different inclined directions of liquid crystal molecules may be systematically distributed among first-color pixel areas PX(R), may be systematically distributed among second-color pixel areas PX(G), and may be systematically distributed among third-color pixel areas PX(B). Therefore, in an image displayed by the liquid crystal display, a luminance in the right viewing angel may be substantially equal to a luminance in the left viewing angle. Advantageously, satisfactory image viewing experience may be provided.

Figure 15:
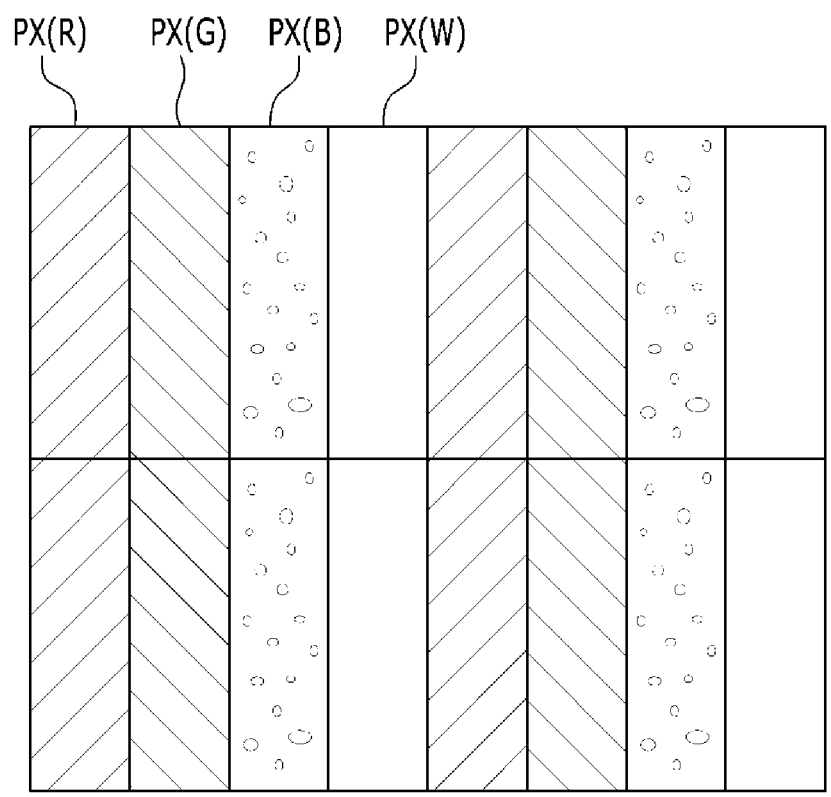
FIG. 15 is a schematic plan view illustrating a plurality of pixel areas of a liquid crystal display according to an embodiment.
Figure 16:
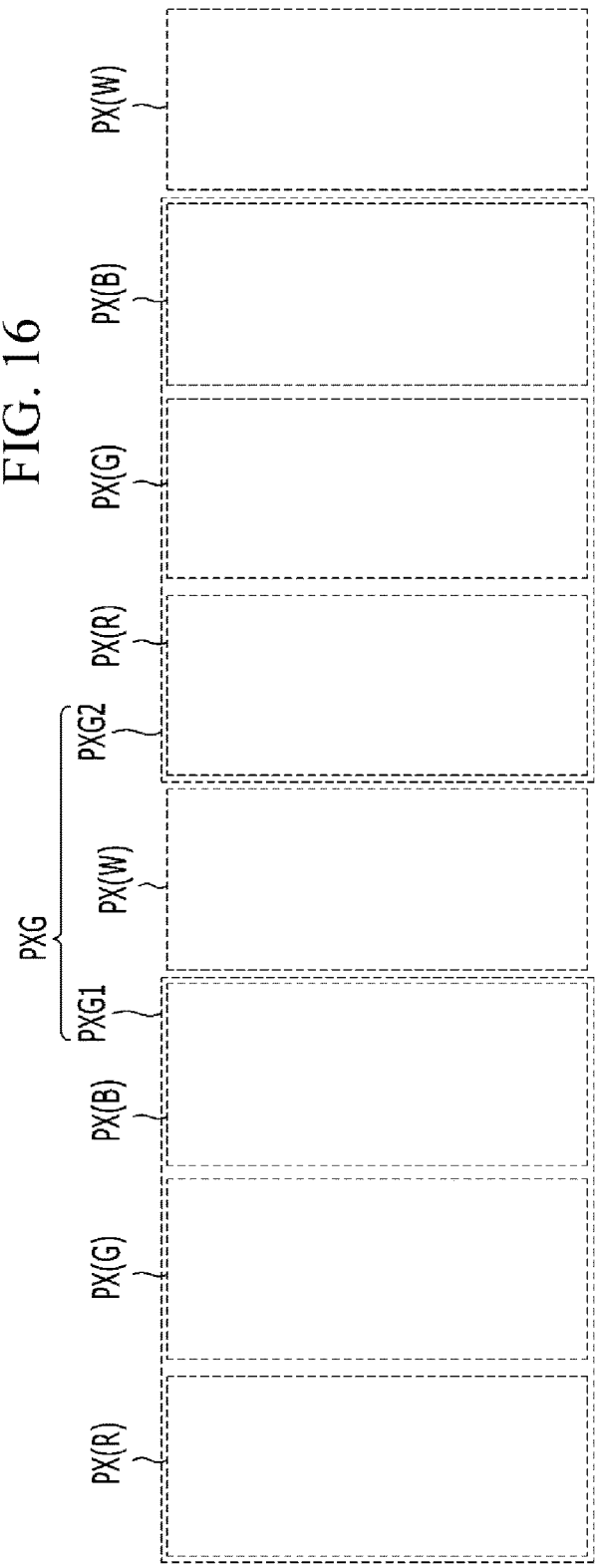
FIG. 16 is a schematic plan view illustrating a plurality of pixel electrodes of a liquid crystal display according to an embodiment.

FIG. 15 is a schematic plan view illustrating a plurality of pixel areas of a liquid crystal display according to an embodiment. FIG. 16 is a schematic plan view illustrating a plurality of pixel electrodes of the liquid crystal display according to an embodiment. The liquid crystal display associated with FIG. 15 and FIG. 16 may have one or more of the features discussed above with reference to FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, and FIG. 14. Description related to identical or analogous features may not be repeated.

Referring to FIG. 15, the liquid crystal display includes a plurality of pixel areas PX, and the plurality of pixel areas PX are arranged in an array. The plurality of pixel areas PX is arranged in the column direction and the row direction.

The plurality of pixel areas PX include a plurality of first-color pixel areas PX(R), a plurality of second-color pixel areas PX(G), a plurality of third-color pixel areas PX(B), and a plurality of fourth-color pixel areas PX(W). A first-color pixel area PX(R) may include a red pixel area, a second-color pixel area PX(G) may include a green pixel area, a third-color pixel area PX(B) may include a blue pixel area, and a fourth-color pixel area PX(W) may include a white pixel area.

Pixel areas PX of the same-color are arranged in the column direction. Pixel areas PX of different-colors may immediately neighbor each other in the row direction.

Referring to FIG. 16, the liquid crystal display includes a plurality of pixel areas, and a pixel electrode 191 or 191' is positioned in each pixel area PX. A plurality of pixel areas PX, e.g., three pixel areas PX, may be grouped to form a pixel group PXG. A pixel group PXG may include (and/or consist of) three consecutive pixel areas PX that are adjacent to each other in the row direction. Three pixel areas PX included in one pixel group PXG include a first-color pixel area PX(R), a second-color pixel area PX(G), and a third-color pixel area PX(B). A fourth-color pixel area PX(W) is located between two immediately neighboring pixel groups PXG in the row direction.

The pixel groups PXG include pixel groups PXG1 and PXG2. In the pixel group PXG1, extension directions of the fine branch parts 194*h* and 194*l* of one pixel electrode 191 are the same as extension directions of the fine branch parts 194*h* and 194*l* of the other three pixel electrodes 191. In the pixel group PXG2, which immediately neighbors the pixel group PXG1, extension directions of the fine branch parts 194*h*' and 194*l*' of one pixel electrode 191' is the same as extension directions of the fine branch parts 194*h*' and 194*l*' of the other three pixel electrodes 191'. An extension direction of the fine branch parts 194*h* and 194*l* in the pixel group PXG1 is different from an extension direction of fine branch parts 194*h* and 194*l* in the immediately neighboring pixel group PXG2.

Figure 17:
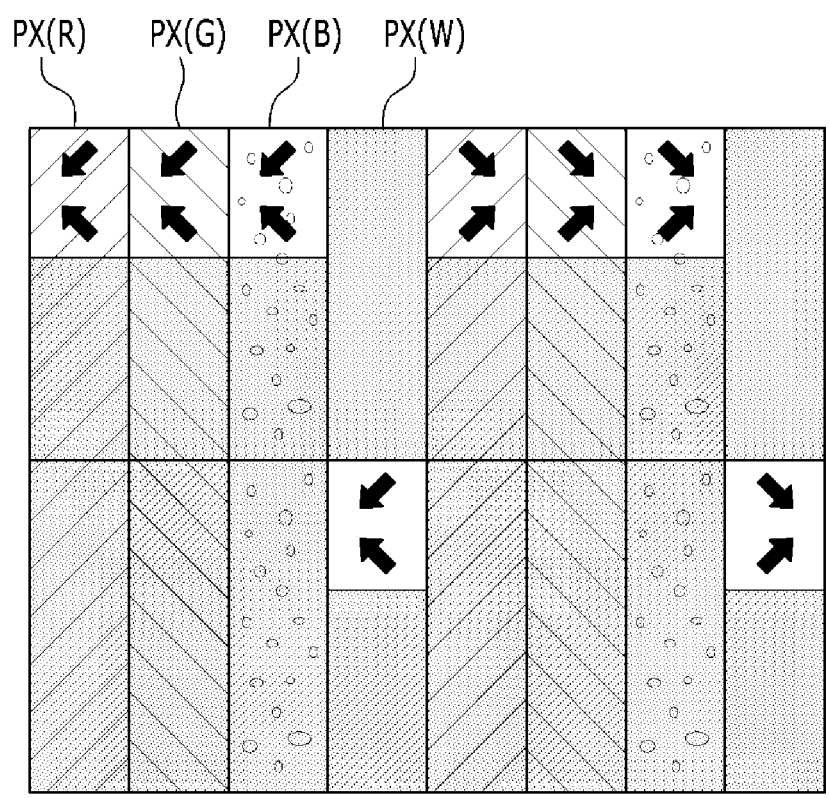
FIG. 17 is a schematic plan view illustrating inclined directions of liquid crystal molecules in a plurality of pixel areas of a liquid crystal display according to an embodiment.

FIG. 17 is a schematic plan view illustrating inclined directions of the liquid crystal molecules in a plurality of pixel areas of a liquid crystal display according to an embodiment. In a first pixel row of the liquid crystal display including a white pixel area, a first-color pixel area, a second-color pixel area, and a third-color pixel area are simultaneously turned on, the white pixel area is turned off; this pattern is repeated in this pixel row.

Referring to FIG. 17, in the first pixel row, in a first first-color pixel area PX(R), liquid crystal molecules incline in the lower left direction and the upper left direction. In a second first-color pixel area PX(R), liquid crystal molecules incline in the lower right direction and the upper right direction.

In the first pixel row, in a first second-color pixel area PX(G), liquid crystal molecules incline in the lower left direction and the upper left direction. In a second second-color pixel area PX(G), liquid crystal molecules incline in the lower right direction and the upper right direction.

In the first pixel row, in a first third-color pixel area PX(B), liquid crystal molecules incline in the lower left direction and the upper left direction. In a second third-color pixel area PX(B), liquid crystal molecules incline in the lower right direction and the upper right direction.

In a second pixel row that immediately neighbors the first pixel row, in a first fourth-color pixel area PX(W), liquid crystal molecules incline in the lower left direction and the upper left direction. In a second fourth-color pixel area PX(W), liquid crystal molecules incline in the lower right direction and the upper right direction.

According to an embodiment, different inclined directions of liquid crystal molecules may be systematically distributed among first-color pixel areas PX(R), may be systematically distributed among second-color pixel areas PX(G), may be systematically distributed among third-color pixel areas PX(B), and may be systematically distributed among fourth-color pixel areas PX(W). Therefore, in an image displayed by the liquid crystal display, a luminance in the right viewing angel may be substantially equal to a luminance in the left viewing angle. Advantageously, satisfactory image viewing experience may be provided.

While some embodiments have been described, possible embodiments are not limited to the described embodiments. Possible embodiments are intended to cover various modifications and equivalent arrangements within the spirit and scope of the appended claims.

What is claimed is:

1. A display device comprising:
a first color filter;
a second color filter;
a first pixel electrode disposed in a first area of a pixel, which overlaps the first color filter and comprises a first stem electrode and a first branch electrode, wherein the first branch electrode is oriented at a first acute angle with respect to the first stem electrode;
a second pixel electrode disposed in a first area of an adjacent pixel, which overlaps the second color filter, immediately neighbors the first pixel electrode in a first direction, and comprises a second stem electrode and a second branch electrode, and wherein a shape of a combination of the second stem electrode and the second branch electrode is a mirror image of a shape of a combination of the first stem electrode and the first branch electrode; and
a third pixel electrode disposed in a second area of the pixel, which overlaps the first color filter, immediately neighbors the first pixel electrode in a second direction which is perpendicular to the first direction, and comprises a third stem electrode and a third branch electrode, wherein a shape of a combination of the third stem electrode and the third branch electrode is a mirror image of the shape of the combination of the first stem electrode and the first branch electrode, and wherein a size of an area which the third pixel electrode covers is bigger than a size of an area which the first pixel electrode covers,
wherein the first color filter has a first color,
the second color filter has a second color which is different from the first color,
the first stem electrode is disposed at an edge of the first area of the pixel, which overlaps the first color filter,
the second stem electrode is disposed at an edge of the first area of the adjacent pixel, which overlaps the second color filter, and
the third stem electrode is disposed at an edge of the second area of the pixel, which overlaps the first color filter.

2. The display device of claim 1, further comprising:
a third color filter; and
a fourth pixel electrode disposed in a first area of another pixel, which overlaps the third color filter, immediately neighbors the first pixel electrode in the first direction, and comprises a fourth stem electrode and a fourth branch electrode, wherein a shape of a combination of the fourth stem electrode and the fourth branch electrode is identical to the shape of the combination of the first stem electrode and the first branch electrode,
wherein the third color filter has a third color,
the third color is different from the first color and the second color, and
the fourth stem electrode is disposed at an edge of the first area of the pixel, which overlaps the third color filter.

3. The display device of claim 2, further comprising:
a fourth color filter; and
a fifth pixel electrode disposed in a first area of another pixel, which overlaps the fourth color filter, immediately neighbors the third pixel electrode in the second direction, and comprises a fifth stem electrode and a fifth branch electrode, wherein a shape of a combination of the fifth stem electrode and the fifth branch electrode is identical to the shape of the combination of the third stem electrode and the third branch electrode,
wherein the fourth color filter has the first color, and
the fifth stem electrode is disposed at an edge of the first area of the pixel, which overlaps the fourth color filter.

4. The display device of claim 1, further comprising:
a third color filter; and
a fourth pixel electrode disposed in a first area of another pixel, which overlaps the third color filter, immediately neighbors the third pixel electrode in the second direction, and comprises a fourth stem electrode and a fourth branch electrode, wherein a shape of a combination of the fourth stem electrode and the fourth branch electrode is identical to the shape of the combination of the first stem electrode and the first branch electrode,
wherein the third color filter has the first color, and
the fourth stem electrode is disposed at an edge of the first area of the pixel, which overlaps the third color filter.

5. The display device of claim 4, further comprising:
a fifth pixel electrode disposed in a second area of the pixel, which overlaps the third color filter, immediately neighbors the fourth pixel electrode in the second direction, and comprises a fifth stem electrode and a fifth branch electrode, wherein a shape of a combination of the fifth stem electrode and the fifth branch electrode is a mirror image of the shape of the combination of the fourth stem electrode and the fourth branch electrode, and
the fifth stem electrode is disposed at an edge of the second area of the pixel, which overlaps the third color filter.

6. The display device of claim 5, further comprising:
a fourth color filter; and
a sixth pixel electrode disposed in a first area of another pixel, which overlaps the fourth color filter, immediately neighbors the fifth pixel electrode in the second direction, and comprises a sixth stem electrode and a sixth branch electrode, wherein a shape of a combination of the sixth stem electrode and the sixth branch electrode is a mirror image of the shape of the combination of the first stem electrode and the first branch electrode, wherein the fourth color filter has the first color, and
the sixth stem electrode is disposed at an edge of the first area of the pixel, which overlaps the fourth color filter.

7. The display device of claim 6, further comprising:
a fifth color filter; and
a seventh pixel electrode disposed in a first area of another pixel, which overlaps the fifth color filter, immediately neighbors the first pixel electrode in the first direction, and comprises a seventh stem electrode and a seventh branch electrode, wherein a shape of a combination of the seventh stem electrode and the seventh branch electrode is a mirror image of the shape of the combination of the first stem electrode and the first branch electrode, wherein the fifth color filter has a third color,
the third color is different from the first color and the second color, and
the seventh stem electrode is disposed at an edge of the first area of the pixel, which overlaps the fifth color filter.

8. The display device of claim 7, further comprising:
an eighth pixel electrode disposed in a second area of the pixel, which overlaps the fifth color filter, immediately neighbors the seventh pixel electrode in the second direction, and comprises an eighth stem electrode and an eighth branch electrode, wherein a shape of a combination of the eighth stem electrode and the eighth branch electrode is a mirror image of the shape of the combination of the seventh stem electrode and the seventh branch electrode, and the eighth stem electrode is disposed at an edge of the second area of the pixel, which overlaps the fifth color filter.

9. The display device of claim 4, further comprising:
a fourth color filter; and
a fifth pixel electrode disposed in a first area of another pixel, which overlaps the fourth color filter, immediately neighbors the first pixel electrode in the first direction, and comprises a fifth stem electrode and a fifth branch electrode, wherein a shape of a combination of the fifth stem electrode and the fifth branch electrode is identical to the shape of the combination of the first stem electrode and the first branch electrode, wherein the fourth color filter has a third color,
the third color is different from the first color and the second color, and
the fifth stem electrode is disposed at an edge of the first area of the pixel, which overlaps the fourth color filter.

10. The display device of claim 9, further comprising: a sixth pixel electrode disposed in a second area of the pixel, which overlaps the fourth color filter, immediately neighbors the fifth pixel electrode in the second direction, and comprises a sixth stem electrode and a sixth branch electrode, wherein a shape of a combination of the sixth stem electrode and the sixth branch electrode is a mirror image of the shape of the combination of the fifth stem electrode and the fifth branch electrode, and the sixth stem electrode is disposed at an edge of the second area of the pixel, which overlaps the fourth color filter.

11. The display device of claim 10, further comprising:
a fifth color filter; and
a seventh pixel electrode disposed in a first area of another pixel, which overlaps the fifth color filter, immediately neighbors the sixth pixel electrode in the second direction, and comprises a seventh stem electrode and a seventh branch electrode, and wherein a shape of a combination of the seventh stem electrode and the seventh branch electrode is identical to the shape of the combination of the first stem electrode and the first branch electrode, wherein the fifth color filter has the third color, and
the seventh stem electrode is disposed at an edge of the first area of the pixel, which overlaps the fifth color filter.

12. The display device of claim 11, further comprising:
a sixth color filter; and
an eighth pixel electrode disposed in a first area of another pixel, which overlaps the sixth color filter, immediately neighbors the fifth pixel electrode in the first direction, and comprises an eighth stem electrode and an eighth branch electrode, wherein a shape of a combination of the eighth stem electrode and the eighth branch electrode is a mirror image of the shape of the combination of the first stem electrode and the first branch electrode, wherein the sixth color filter has the second color, and
the eighth stem electrode is disposed at an edge of the first area of the pixel, which overlaps the sixth color filter.

13. A display device comprising:
a first color filter, which has a first color;
a first pixel electrode, which overlaps the first color filter and comprises a first stem electrode and a first branch electrode, wherein the first branch electrode is oriented at a first acute angle with respect to the first stem electrode;
a second color filter, which has a second color, wherein the second color is different from the first color;
a second pixel electrode, which overlaps the second color filter, immediately neighbors the first pixel electrode, and comprises a second stem electrode and a second branch electrode, wherein the second stem electrode is aligned with the first stem electrode in a first direction, and wherein a shape of a combination of the second stem electrode and the second branch electrode is a mirror image of a shape of a combination of the first stem electrode and the first branch electrode;
a third color filter, which has a third color, wherein the third color is different from each of the first color and the second color;
a third pixel electrode, which overlaps the third color filter, immediately neighbors the first pixel electrode, and comprises a third stem electrode and a third branch electrode, wherein a shape of a combination of the third stem electrode and the third branch electrode is identical to the shape of the combination of the first stem electrode and the first branch electrode, and wherein the third stem electrode is aligned with the first stem electrode in the first direction;
a fourth color filter, which has a fourth color, wherein the fourth color is different from each of the first color, the second color, and the third color; and
a fourth pixel electrode, which overlaps the fourth color filter, immediately neighbors the third pixel electrode, and comprises a fourth stem electrode and a fourth branch electrode, wherein the fourth stem electrode is aligned with the third stem electrode in the first direction, and wherein a shape of a combination of the fourth stem electrode and the fourth branch electrode is identical to the shape of the combination of the third stem electrode and the third branch electrode.

14. The display device of claim 13, further comprising:
a fifth color filter, which has the fourth color; and a fifth pixel electrode, which overlaps the fifth color filter, immediately neighbors the second pixel electrode, and comprises a fifth stem electrode and a fifth branch electrode, wherein the fifth stem electrode is aligned with the second stem electrode in the first direction, and wherein a shape of a combination of the fifth stem electrode and the fifth branch electrode is identical to the shape of the combination of the second stem electrode and the second branch electrode.

15. The display device of claim 14, further comprising:
a sixth color filter, which has the third color; and
a sixth pixel electrode, which overlaps the sixth color filter, immediately neighbors the fifth pixel electrode, and comprises a sixth stem electrode and a sixth branch electrode, wherein the sixth stem electrode is aligned with the fifth stem electrode in the first direction, and wherein a shape of a combination of the sixth stem electrode and the sixth branch electrode is identical to the shape of the combination of the second stem electrode and the second branch electrode.

16. The display device of claim 15, further comprising:
a seventh color filter, which has the first color; and
a seventh pixel electrode, which overlaps the seventh color filter, immediately neighbors the sixth pixel electrode, and comprises a seventh stem electrode and a seventh branch electrode, wherein the seventh stem electrode is aligned with the sixth stem electrode in the first direction, and wherein a shape of a combination of the seventh stem electrode and the seventh branch electrode is identical to the shape of the combination of the second stem electrode and the second branch electrode.

17. The display device of claim 16, further comprising:
an eighth color filter, which has the second color; and
an eighth pixel electrode, which overlaps the eighth color filter, immediately neighbors the seventh pixel electrode, and comprises an eighth stem electrode and an eighth branch electrode, wherein the eighth stem electrode is aligned with the seventh stem electrode in the first direction, and wherein a shape of a combination of the eighth stem electrode and the eighth branch electrode is identical to the shape of the combination of the first stem electrode and the first branch electrode.

18. The display device of claim 13, wherein the second color is a white color.

* * * * *